United States Patent
Deboy

(10) Patent No.: US 11,916,472 B2
(45) Date of Patent: Feb. 27, 2024

(54) POWER CONVERTER ARRANGEMENT WITH INCREASED SURGE VOLTAGE ROBUSTNESS

(71) Applicant: Infineon Technologies Austria AG, Villach (AT)

(72) Inventor: Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 127 days.

(21) Appl. No.: 17/534,519

(22) Filed: Nov. 24, 2021

(65) Prior Publication Data

US 2022/0181963 A1  Jun. 9, 2022

(30) Foreign Application Priority Data

Dec. 7, 2020  (EP) ..................................... 20212265

(51) Int. Cl.
*H02M 1/32* (2007.01)
*H02M 1/00* (2006.01)
(Continued)

(52) U.S. Cl.
CPC ............ *H02M 1/32* (2013.01); *H02M 1/0058* (2021.05); *H02M 3/01* (2021.05); *H02M 3/33576* (2013.01)

(58) Field of Classification Search
CPC ........ H02M 1/32; H02M 1/0058; H02M 3/01; H02M 3/33576; H02M 1/322; H02M 5/4585; H02M 3/33507; H02M 7/797
See application file for complete search history.

(56) References Cited

U.S. PATENT DOCUMENTS

| | | | |
|---|---|---|---|
| 9,729,063 B2* | 8/2017 | Kim | .................. H02M 3/33507 |
| 2014/0070743 A1* | 3/2014 | Yoshida | ..................... H02P 6/24 |

(Continued)

FOREIGN PATENT DOCUMENTS

| | | |
|---|---|---|
| CN | 103078339 B | 2/2015 |
| EP | 2587660 A1 | 5/2013 |
| EP | 3089343 A1 | 11/2016 |

OTHER PUBLICATIONS

Rodriguez, Jose R., et al., "PWM Regenerative Rectifiers: State of the Art", IEEE Transactions on Industrial Electronics, vol. 52, No. 1, Feb. 2005, pp. 5-22.

*Primary Examiner* — Shawki S Ismail
*Assistant Examiner* — Htet Z Kyaw
(74) *Attorney, Agent, or Firm* — Murphy, Bilak & Homiller, PLLC

(57) ABSTRACT

A method for operating a power converter arrangement and a corresponding controller are disclosed. The method includes operating the power converter arrangement in a surge mode, when a DC link voltage of the power converter arrangement reaches a first voltage threshold. The power converter includes a first power converter having an input and an output; a second power converter having an input and an output; and a DC link capacitor circuit coupled to the output of the first power converter and the input of the second power converter and providing the DC link voltage. Operating the power converter arrangement in the surge mode includes: deactivating the second power converter; and operating, at least temporarily, the first power converter in a reverse mode to transfer energy from the DC link capacitor circuit to the input of the first power converter.

19 Claims, 13 Drawing Sheets

(51) Int. Cl.
*H02M 3/00* (2006.01)
*H02M 3/335* (2006.01)

(56) References Cited

U.S. PATENT DOCUMENTS

| | | | |
|---|---|---|---|
| 2016/0329824 A1* | 11/2016 | Sugahara | ................. H02H 3/05 |
| 2017/0005568 A1 | 1/2017 | Sona | |
| 2017/0040886 A1* | 2/2017 | Leitner | ............. H02M 3/33515 |
| 2018/0175734 A1* | 6/2018 | Gherghescu | ........ H02M 3/1584 |
| 2021/0167715 A1* | 6/2021 | Tagawa | ................... H02P 27/08 |

* cited by examiner

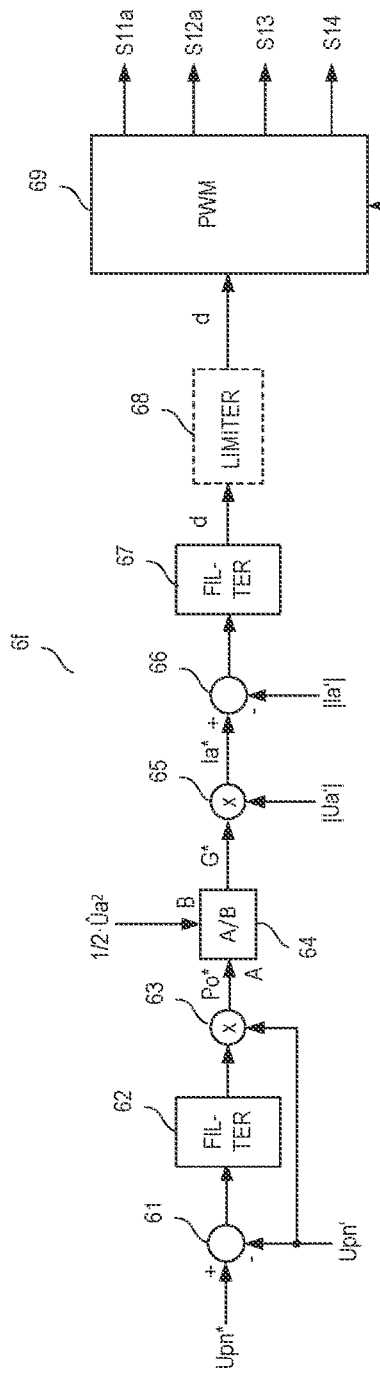
FIG 12
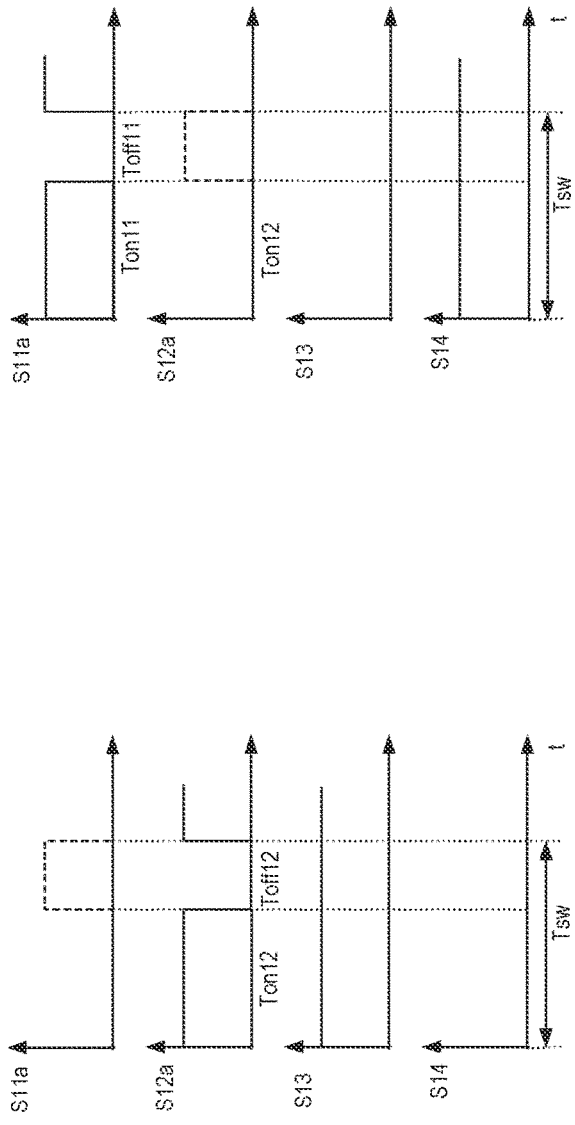
FIG 13A
FIG 13B

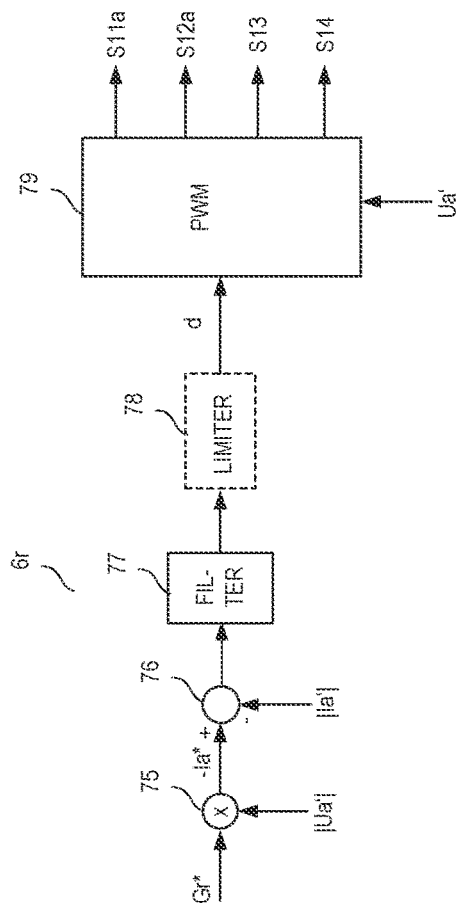
FIG 14
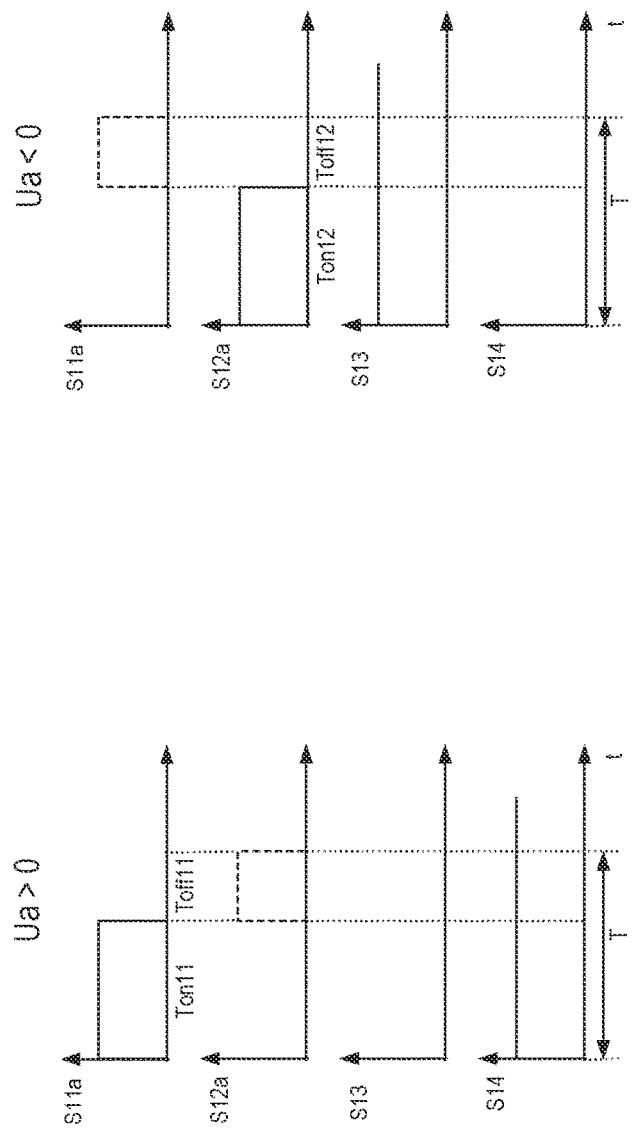
FIG 15A
FIG 15B

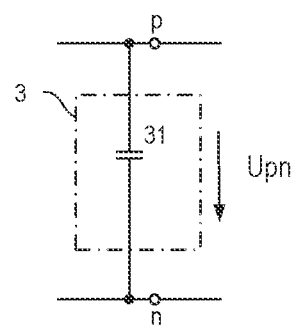 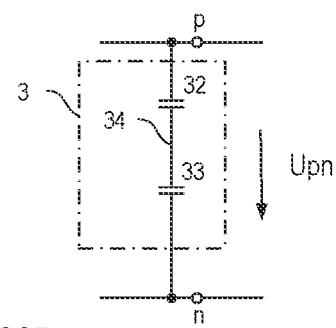
FIG 22A                                FIG 22B

POWER CONVERTER ARRANGEMENT WITH INCREASED SURGE VOLTAGE ROBUSTNESS

TECHNICAL FIELD

This disclosure relates in general to a power converter arrangement, in particular a power converter arrangement configured to be connected to a power grid.

BACKGROUND

Voltage surges in a power grid, such as surges resulting from lightning strike, are a major issue in power converter arrangements that are configured to be coupled to a power grid and generate a direct voltage or a direct current based on power received from the power grid. Power converter arrangements of this type may include a PFC (Power Factor Correction) converter, a capacitor (sometimes referred to as DC link capacitor), and a DC/DC converter. The PFC converter is configured to have an input coupled to the power grid, and generate a regulated voltage (sometimes referred to as DC link voltage) across the DC link capacitor connected to an output of the PFC converter. The DC/DC converter is configured to generate a regulated direct current or a regulated direct voltage based on the DC link voltage.

Surges occurring in the power grid may cause the DC link voltage to increase to voltage levels that are significantly higher than a desired DC link voltage reference. Operating the DC/DC converter under increased DC link voltage levels may cause a high voltage stress in electronic switches implemented in the DC/DC converter and/or may make it necessary to implement these switches with a voltage blocking capability that is higher than the voltage blocking capability necessary to withstand the DC link voltage reference. The latter, however, increases conduction losses that occur in the electronic switches.

There is a need for a power converter arrangement with a high surge robustness.

SUMMARY

One example relates to a method for operating a power converter arrangement. The method includes operating the power converter arrangement in a surge mode when a DC link voltage of the power converter arrangement reaches a first voltage threshold. The power converter arrangement includes a first power converter including an input and an output, a second power converter including an input and an output, and a DC link capacitor circuit coupled to the output of the first power converter and the input of the second power converter and providing the DC link voltage. Operating the power converter arrangement in the surge mode includes deactivating the second power converter, and, at least temporarily, operating the first power converter in a reverse mode to transfer energy from the DC link capacitor circuit to the input of the first power converter.

Another example relates to a power converter arrangement. The power converter arrangement includes a first power converter with an input and an output, a second power converter with an input and an output, a DC link capacitor circuit coupled to the output of the first power converter and the input of the second power converter, and a control circuit configured to operate the power converter arrangement in a surge mode when a DC link voltage across the DC link capacitor circuit reaches a first voltage threshold. Operating the power converter arrangement in the surge mode includes deactivating the second power converter, and, at least temporarily, operating the first power converter in a reverse mode to transfer energy from the DC link capacitor circuit to the input of the first power converter.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIG. 12 illustrates one example of a forward mode controller included in the controller shown in FIG. 9 and configured to control operation of the first power converter in a forward mode;

FIGS. 13A and 13B show signal diagrams that illustrate a functionality of a pulse-width modulator (PWM) included in the forward mode controller shown in FIG. 12;

FIG. 14 shows one example of a reverse mode controller included in the controller shown in FIG. 9 and configured to control operation of the first power converter in a reverse mode;

FIGS. 15A and 15B show signal diagrams that illustrate a functionality of a PWM modulator included in the reverse mode controller shown in FIG. 14;

FIGS. 22A and 22B include two examples of the DC link capacitor circuit.

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
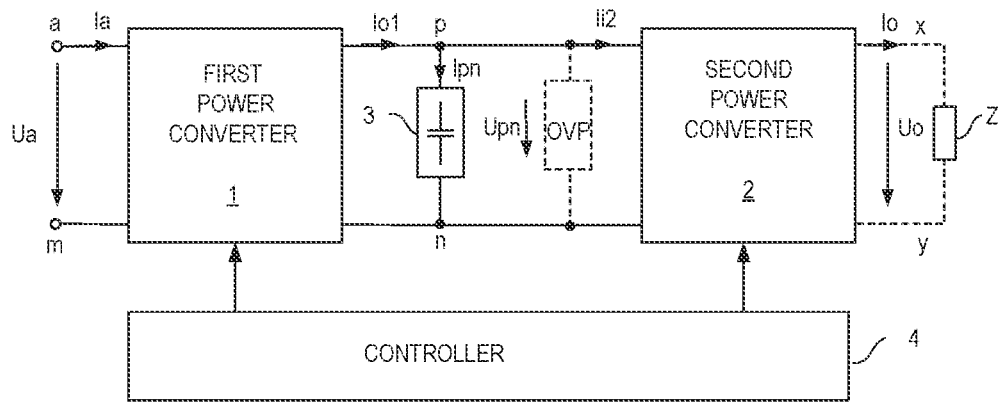
FIG. 1 illustrates one example of a power converter arrangement with a first power converter, a second power converter and a DC link capacitor circuit coupled to an output of the first power converter and an input of the second power converter.

FIG. 1 shows one example of a power converter arrangement. This power converter arrangement includes a first power converter 1, a second power converter 2 and a capacitor circuit 3, which is also referred to as DC link capacitor circuit 3 in the following. Each of the first power converter 1 and the second power converter 2 has an input and an output. The input a, m of the first power converter 1 is configured to be coupled to a voltage source and to receive an input voltage Ua from the power source. The power source is a power grid, for example.

The first power converter shown in FIG. 1 is a single phase converter that receives one input voltage Ua. This, however, is only an example. The operating principle of the first power converter 1 explained in the following applies to a 3-phase first power converter that receives three input voltages and optionally a neutral wire accordingly. One example of a three phase power converter is explained herein further below.

The DC link capacitor circuit 3 is coupled to the output of the first power converter 1 and the input of the second power converter 2. More explicitly, the DC link capacitor circuit 3 is connected between DC link nodes p, n, wherein the output of the first power converter 1 is connected to the DC link nodes p, n and the input of the second power converter 2 is connected to the DC link nodes p, n.

The output x, y of the second power converter 2 is configured to have a load Z (illustrated in dashed lines in FIG. 1) connected thereto. The load may be any kind of load, in particular any kind of DC load. Examples of the load include, but are not restricted to, any kind of server or telecommunication device, a battery, or the like. The input a, m of the first power converter 1 forms an input of the power converter arrangement and the output x, y of the second power converter 2 forms an output of the power converter arrangement.

The power converter arrangement shown in FIG. 1 is configured, in a first operating mode, to receive the input voltage Ua and an input current Ia at the input a, m of the first power converter 1 and to provide a regulated output voltage Uo or a regulated output current Io at the output x, y of the second power converter 2. This first operating mode is also referred to as normal operating mode in the following. In the normal operating mode, the first power converter is configured to regulate a DC link voltage Upn across the DC link capacitor circuit 3 (between the DC link nodes p, n) such that the DC link voltage Upn essentially equals a DC link voltage reference Upn*. In the normal operating mode, the second power converter 2 is configured to receive the DC link voltage Upn and an input current Ii2 and to generate the output voltage Uo and the output current Io based on the received DC link voltage Upn and the received input current Ii2.

Figure 2:
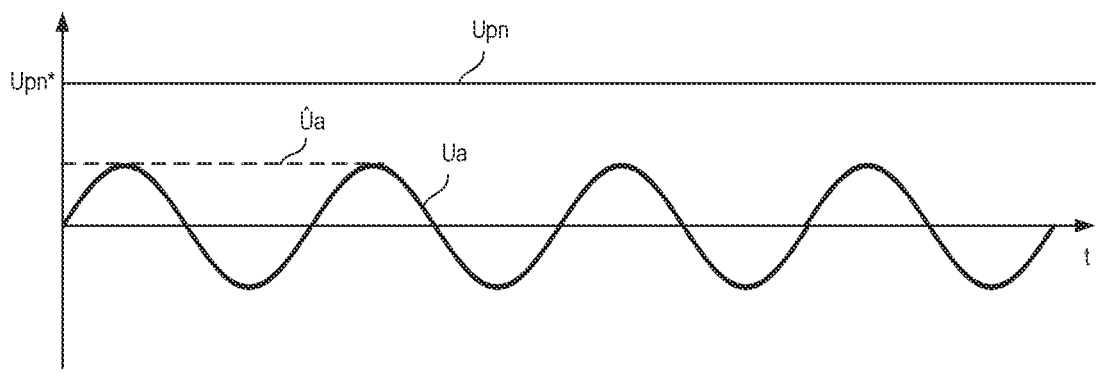
FIG. 2 shows signal waveforms of an input voltage received by the first power converter and a DC link voltage according to one example.

According to one example, the input voltage Ua received by the first power converter 1 in the normal operating mode is an alternating voltage such as a sinusoidal voltage. A signal diagram of a sinusoidal input voltage Ua according to one example is illustrated in FIG. 2. The alternating input voltage Ua has an amplitude Ûa (peak voltage) and a frequency. According to one example, the input voltage is a 230 $V_{RMS}$ or a 110$V_{RMS}$ voltage. The amplitude Ûa is about 325V or about 155V, respectively, in this case. The frequency is 50 Hz or 60 Hz.

According to one example, in the normal operating mode, the first power converter 1 operates as a boost converter so that the DC link voltage Upn is a direct voltage and higher than the amplitude (peak voltage) Ûa of the input voltage Ua. The signal diagram of a DC link voltage Upn generated in this way is also illustrated in FIG. 2. A voltage level of the DC link is selected from between 380V and 450V, for example.

Figure 3:
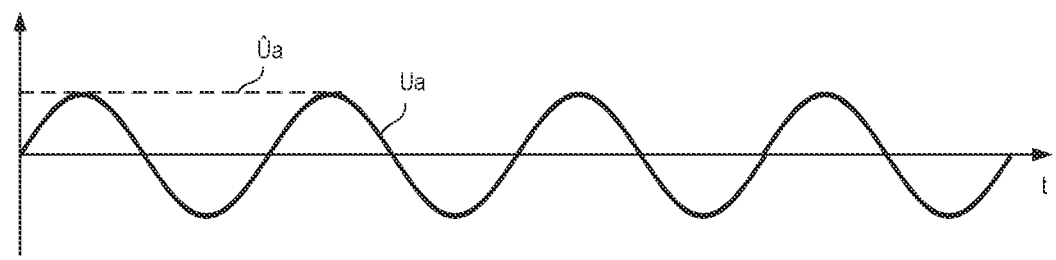
FIG. 3 shows signal waveforms of an input voltage and an average input current of a first power converter operating as a PFC converter.
Figure 3:
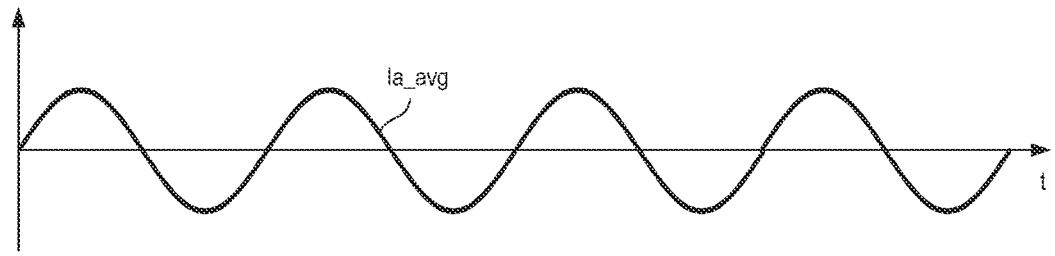

According to one example, the first power converter 1 is a PFC (Power Factor Correction) converter, which is a power converter configured not only to regulate the DC link voltage, but also configured to regulate a signal waveform of the average input current Ia_avg in such a way that the signal waveform of the average input current Ia_avg follows the signal waveform of the input voltage Ua. The input current Ia may be regulated in such a way that the average input current Ia_avg is in phase with the input voltage Ua. Alternatively, the input current Ia is regulated such that there is a predefined phase difference between the input voltage Ua and the average input current Ia_avg. A signal waveform of an average input current Ia_avg being in phase with the input voltage Ua is illustrated in FIG. 3.

The first power converter 1 is a switched-mode power converter. That is, the first power converter regulates the DC link voltage Upn and the signal waveform of the average input current Ia_avg by a switched-mode operation of electronic switches included in the first power converter. Due to the nature of this switched-mode operation, the input current Ia varies, wherein a frequency of these variations is essentially given by a switching frequency of the first power converter. This switching frequency is significantly higher than a frequency of the alternating input voltage Ua. According to one example, the frequency of the alternating input voltage Ua is 50 Hz or 60 Hz, and the switching frequency fsw is several 10 kilohertz such as between 20 kHz and 90 kHz. The average input current Ia_avg is the input current obtained by averaging the input current over each of the drive cycles of the switched-mode operation of the first power converter 1. The duration Tsw of each drive cycle is given by the reciprocal of the switching frequency (Tsw=1/fsw). In the following, unless stated otherwise, the input current of the first power converter 1 means the average input current.

During operation of the power converter arrangement, surge pulses (surge voltages) may occur at the input a, m of the first power converter 1. Such surge pulses may result from lightning strikes near the power grid. Surge pulses resulting from lightning strikes are, in particular, an issue, when the power converter arrangement is implemented in remote locations outside buildings or cabinets and connected to a power grid (power line) that is not protected against overvoltage. The first power converter 1 includes at least one internal current path between the input and the output which allows a current to flow from the input a, m to the DC link nodes p, n when the input voltage Ua becomes higher than the DC link voltage Upn. This is explained in detail herein further below.

Figure 4:
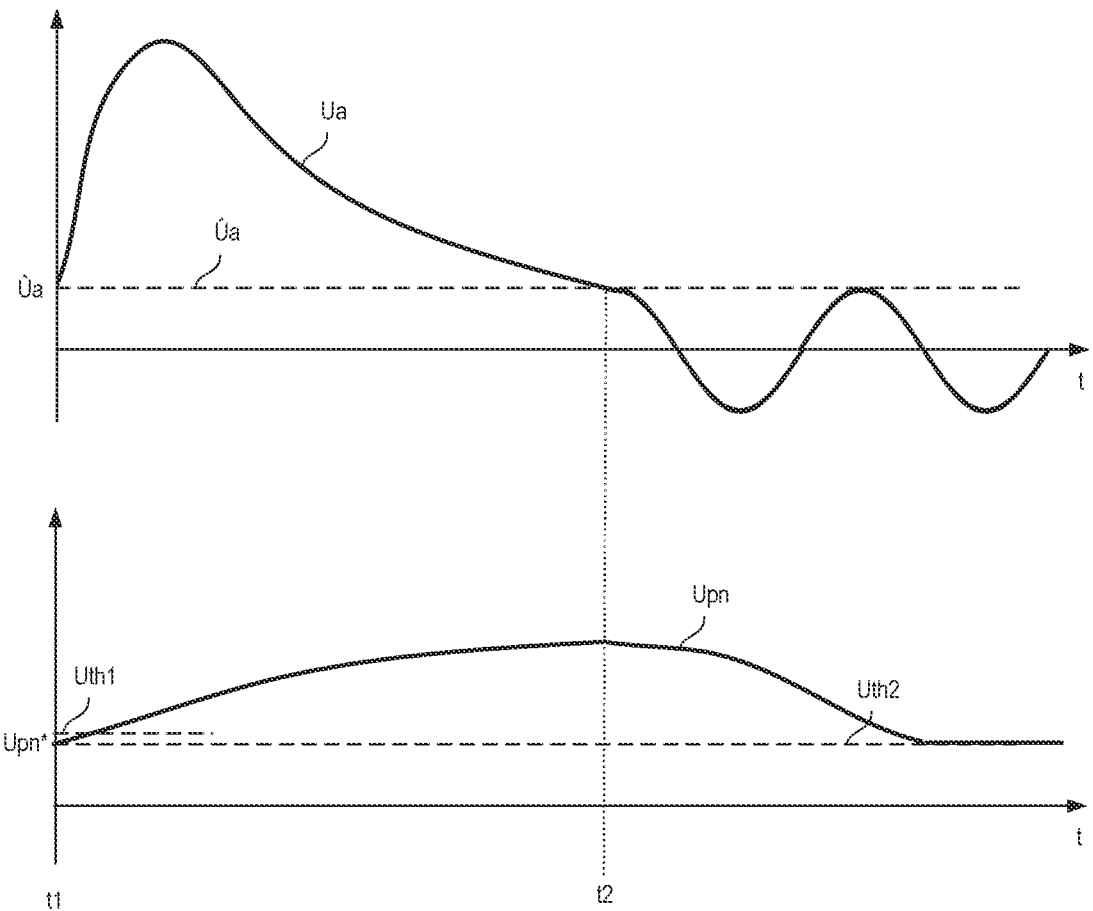
FIG. 4 illustrates signal waveforms of the input voltage of the first power converter and a DC link voltage across the DC link capacitor circuit when a surge pulse of the input voltage occurs.

FIG. 4 schematically illustrates the occurrence of a surge pulse of the input voltage Ua. In FIG. 4, t1 denotes a time instance at which the surge pulse causes the input voltage Ua to rise above the amplitude (peak) Ûa of the normal grid voltage, and t2 denotes a time instance at which the surge pulse has a decayed, so that after the second time instance t2, the signal waveform of the input voltage Ua has a sinusoidal waveform again. Referring to FIG. 4, the surge pulse of the input voltage Ua causes the DC link voltage Upn to increase to voltage levels higher than the DC link voltage reference Upn*. Due to inductors included in the first power converter 1, the waveform of the increasing DC link voltage Upn may be different from the waveform of the surge pulse. The duration of the surge pulse, that is a time difference between the second time instance t2 and the first time instance t1 may range from a few microseconds (such as 2 microseconds), for example, to a few hundred microseconds (such as 400 microseconds), for example.

The surge pulse of the input voltage Ua may cause the DC link voltage Upn to increase to voltage levels that are significantly above the DC link voltage reference Upn*, such as voltage levels of several kilovolts (kV). Such voltage levels of the DC link voltage Upn may cause large voltage stress for electronic switches included in the second power converter 2.

In order to protect the second power converter 2, a method for operating the power converter arrangement, according to one example, includes operating the power converter arrangement in a surge mode when a surge pulse of the input voltage Ua occurs. According to one example, operating the power converter arrangement in the surge mode not only protects the second power converter 2 but also decreases the DC link voltage Upn to a voltage level given by the DC link voltage reference Upn* after the surge pulse has decayed. A state diagram that illustrates operating the power converter arrangement in the surge mode is illustrated in FIG. 5.

Figure 5:
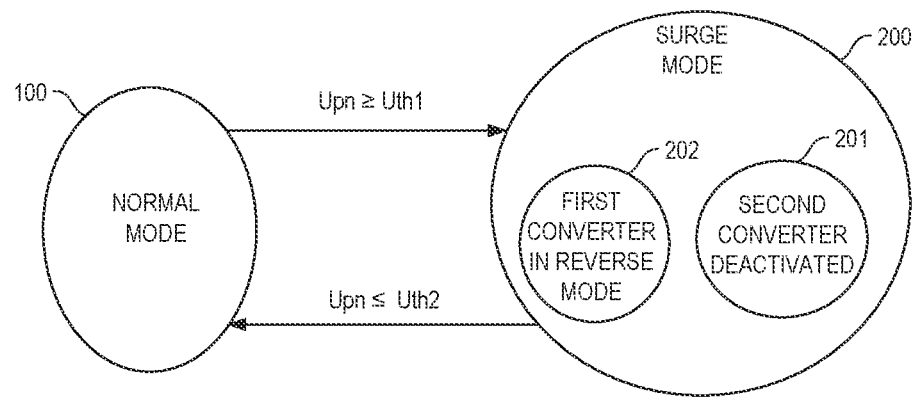
FIG. 5 shows a state diagram that illustrates one example of a method for operating the power converter arrangement.

According to FIG. 5, the power converter arrangement is operated in the surge mode 200 when the DC link voltage Upn reaches a predefined first voltage threshold Uth1 (Upn≥Uth1). The first voltage threshold Uth1 is higher than the DC link voltage reference Upn*. According to one example, the first threshold voltage Uth1 is selected from between 1.01 times and 1.2 times the DC link voltage reference Upn* (1.01×Upn*<Uth1<1.2×Upn*). According to another example, the first voltage threshold Uth1 is between 10 V and 50 V higher than the DC link voltage reference Upn* (Upn*+10 V<Uth1<Upn*+50 V). Referring to FIG. 5, operating the power converter arrangement in the surge mode includes deactivating the second power converter (201) and operating the first power converter in a reverse mode (202). Deactivating the second power converter 2 includes interrupting a power transfer (energy transfer) from the input to the output of the second power converter 2, in order to protect the second power converter 2 from the high voltage occurring between the DC link nodes p, n. Operating the first power converter 1 in the reverse mode includes operating the first power converter 1 such that energy is transferred from the DC link capacitor circuit 2 via the first power converter 1 to the input a, m and into the power grid in order to reduce the DC link voltage Upn to the voltage level given by the DC link voltage reference Upn*. Operating the first power converter 1 in the reverse mode includes operating the first power converter 1 in the reverse mode at least temporarily, that is, at least for a certain time period during the surge mode. Thus. the first power converter not necessarily operates in the reverse mode throughout the surge mode but may operate in the reverse mode only during a portion of a duration of the surge mode. This is explained in detail herein below. According to one example, the second power converter 2 is deactivated throughout the surge mode.

Referring to FIG. 5, operating the power converter arrangement may change from operating the power converter in the surge mode 200 to operating the power converter in the normal mode 100, when the DC link voltage Upn in the surge mode falls below a second voltage threshold Uth2. According to one example, this second voltage threshold Uth2 is lower than the first threshold and equal to or higher than the DC link voltage reference Upn* (Uth1>Uth2≥Upn*).

Referring to the above, in the normal mode 100, the first power converter 1 transfers energy from the input a, m to the DC link nodes p, n, in order to regulate the DC link voltage Upn. This operating mode of the first power converter 1 is also referred to as forward mode in the following. Further, in the normal mode 100 of the power converter arrangement, the second power converter 2 transfers energy from the DC link nodes p, n to the output x, y, in order to regulate the output voltage Uo or the output current Io.

Figure 6:
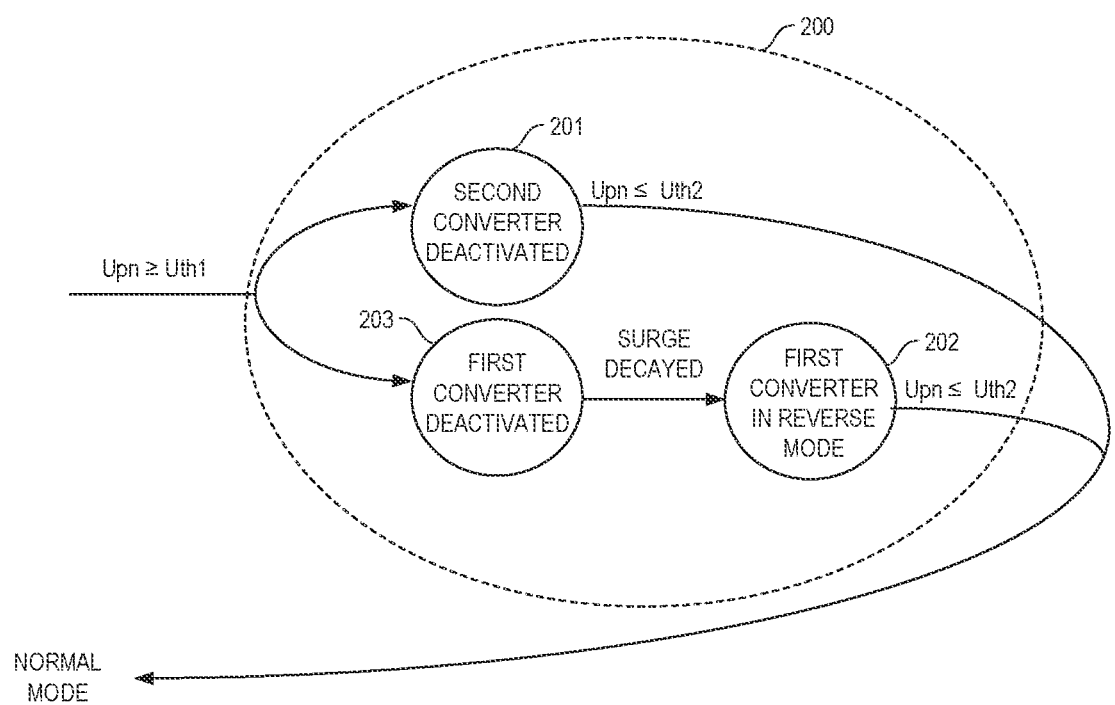
FIG. 6 shows a state diagram that illustrates one example of operating the power converter arrangement in a surge mode according to one example.

FIG. 6 illustrates one example of operating the power converter arrangement in the surge mode 200 in greater detail. According to this example, when the DC link voltage Upn reaches the first threshold voltage Uth1, not only the second power converter 2 is deactivated, but also the first power converter 1 is deactivated (203). Deactivating the first power converter 1 includes interrupting a switched-mode operation of the first power converter 1, so that an energy transfer from the input a, m of the first power converter 1 to the DC link nodes p, n may only occur due to passive components included in the first power converter 1. This is explained in detail herein further below.

Referring to the above, operating the power converter arrangement in the surge mode 200 includes operating the first power converter in the reverse mode. In the example shown in FIG. 6, operating the first power converter 1 in the reverse mode starts when the surge pulse has decayed. Ways to detect when the surge mode has decayed are explained herein further below.

Figure 7:
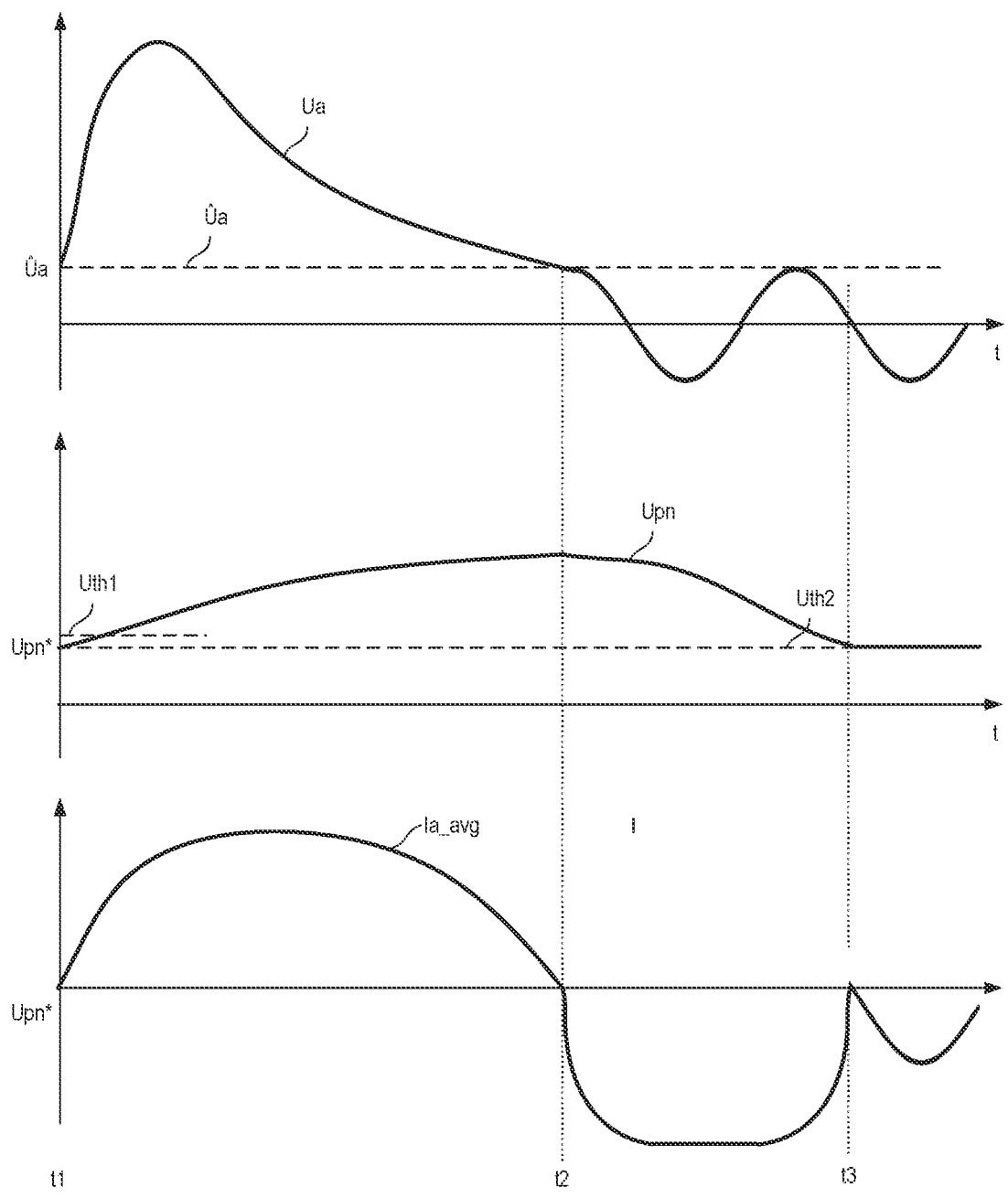
FIG. 7 shows signal waveforms that illustrate operating the power converter arrangement in the surge mode in greater detail.

FIG. 7 shows the signal diagrams according to FIG. 4 and additionally shows a signal waveform of the average input current Ia_avg in the surge mode of the power converter arrangement. Referring to FIG. 7, the surge pulse, which occurs between the first time instance t1 and the second time instance t2 drives a current through the first power converter 1 which causes the DC link voltage Upn to increase. At the second time instance t2, the surge pulse has decayed so that the current driven by the surge pulse through the first power converter 1 essentially reaches zero. In the example illustrated in FIG. 7, the reverse mode operation of the first power converter 1 starts at or after the second time instance t2, so that after the second time instance t2 the input current changes its direction and current is fed back from the first power converter 1 into the power grid. The power converter arrangement resumes the normal operating mode at a third time instance t3 when the DC link capacitor circuit 3 has been discharged by the first power converter 1 to such an extent that the DC link voltage Upn reaches the second threshold voltage Uth2. Just for the purpose of illustration, this second threshold Uth2 essentially equals the DC link voltage reference Upn* in the example shown in FIG. 7.

Referring to FIG. 6, the first power converter 1 may be deactivated in the surge mode 200 until the surge pulse has decayed. According to one example, detecting when the surge pulse has decayed may include monitoring at least one operating parameter of the first power converter 1. According to one example, this parameter is the input current Ia, wherein the first power converter 1 starts operating in the reverse mode when the input current Ia reaches zero. Alternatively, or additionally to the input current Ia, the DC link current Ipn into the DC link capacitor is monitored, wherein the first power converter 1 starts operating in the reverse mode when the DC link current Ipn reaches zero. According to another example, the operating parameter that is monitored in order to detect when the surge pulse has decayed is the DC link voltage Upn, more specifically, a time derivative of the DC link voltage Upn. According to one example, it is detected that the surge pulse has decayed when the time derivative of the DC link voltage Upn in the surge mode 200 reaches zero, so that the first power converter 1 starts operating in the reverse mode.

Figure 8:
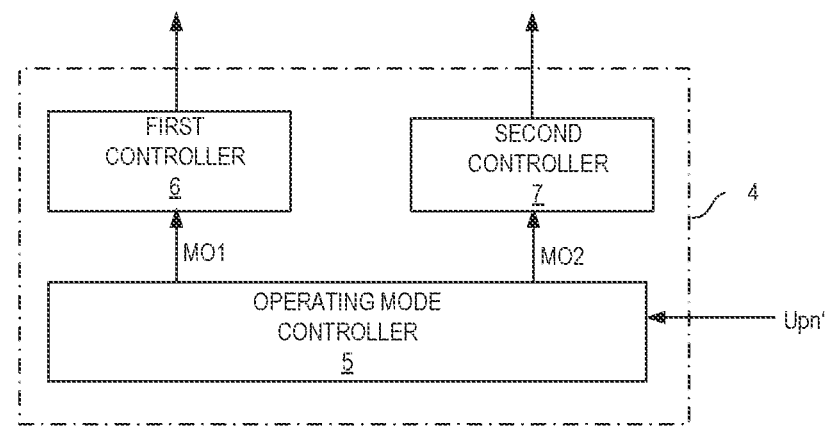
FIG. 8 shows a block diagram of one example of a main controller configured to control operation of the power converter arrangement.

FIG. 8 shows a block diagram of one example of a controller 4 that is configured to control operation of the power converter arrangement in accordance with the method explained herein before. Referring to FIG. 8, this controller 4, which is also referred to as main controller in the following, includes a first controller 6 configured to control operation of the first power converter 1, a second controller 7 configured to control operation of the second power converter 2, and an operating mode controller 5. The operating mode controller 5 receives a DC link voltage signal Upn', which represents the DC link voltage Upn. This DC link voltage signal Upn' may be obtained using any kind of voltage measurement circuit (not shown). The operating mode controller 5 controls operation of the first controller 6 using at least one first operating mode signal MO1, and controls operation of the second controller 7 using at least one second operating mode signal MO2. Based on the DC link voltage signal Upn', the operating mode controller 5 operates the power converter arrangement either in the normal mode or the surge mode. In the normal operating mode, the operating mode controller 5 causes the first controller 6 to operate the first power converter 1 in the forward mode, so that energy is transferred from the input a, m to the DC link nodes p, n and the DC link voltage Upn is regulated. Further, in the normal mode, the operating mode controller 5 causes the second controller 7 to operate the second power converter 2 in a switched-mode operation so that energy is transferred from the DC link nodes p, n to the output x, y and the output voltage Uo or the output current Io is regulated.

In the surge mode, the operating mode controller 5 causes the first controller 6 to operate the first power converter 1 at least temporarily in the reverse mode, so that energy is transferred from the DC link capacitor circuit 3 to the input a, m and the power grid. Further, in the surge mode, the operating mode controller 5 causes the second controller 7 to deactivate the second power converter 2, that is, to interrupt the switched-mode operation of the second power converter 2.

It should be noted that the block diagram shown in FIG. 8 illustrates the functionality of the main controller 4 rather than its implementation. According to one example, the main controller 4 includes a microprocessor and the function of the operating mode controller 5, the first controller 6 and the second controller 7 is performed by software executed by the microprocessor.

Figure 9:
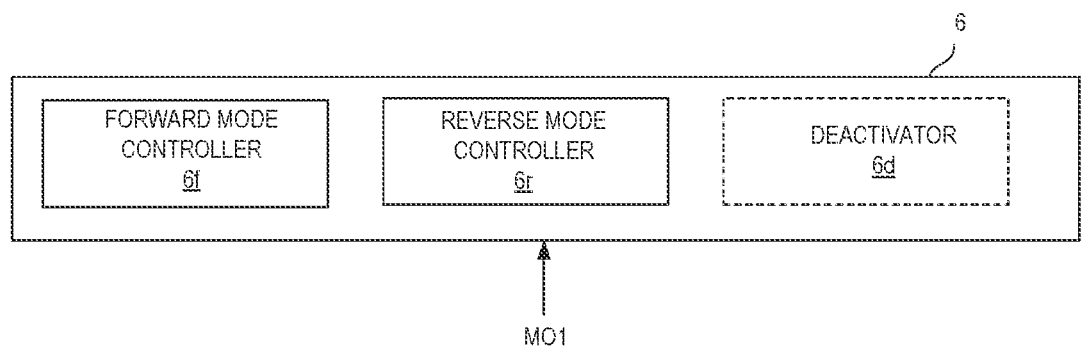
FIG. 9 shows a block diagram of one example of a first controller configured to control operation of the first power converter.

FIG. 9 shows one example of the first controller 6. This first controller 6 includes a forward mode controller 6f configured to control operation of the first power converter 1 in the forward mode, and a reverse mode controller 6r configured to control operation of the first power converter 1 in the reverse mode. Optionally, the first controller 6 further includes a deactivator 6d configured to deactivate the first power converter 1. Operation of the first controller 6 is governed by the first operating mode signal MO1, wherein the first operating mode signal MO1, in the normal mode, activates the forward mode controller 6f and deactivates the reverse mode controller 6r. In the surge mode, the first operating mode signal MO1 deactivates the forward mode controller 6f and activates the reverse mode controller 6r at least temporarily. That is, the reverse mode controller 6r is activated either throughout the surge mode, or after the surge pulse has decayed. In those time periods in which the reverse mode controller 6r is deactivated the deactivator 6d is activated. In order to detect when the surge pulse has decayed and generate the first operating mode signal MO1 accordingly, the operating mode controller 5 may monitor the DC link voltage signal Upn' or may receive and monitor a signal representing another one of the operating parameters, such as the DC link current Ipn or the output current Io1 of the first power converter 1.

Figure 10:
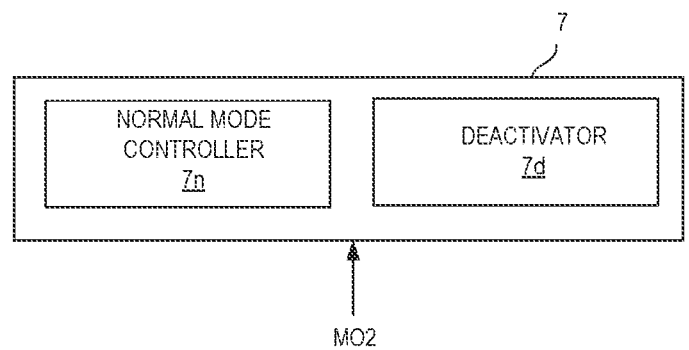
FIG. 10 shows a block diagram of one example of a second controller configured to control operation of the first power converter.

FIG. 10 shows one example of the second controller 7. This second controller 7 includes a normal mode controller 7n configured to control operation of the second power converter 2 in the normal mode of the power converter arrangement, and a deactivator 7d configured to deactivate the second power converter 2 in the surge mode of the second power converter 2. Operation of the second controller 7 is governed by the second operating mode signal MO2, wherein the second operating mode signal MO1, in the normal mode, activates the normal mode controller 7n and, in the surge mode, activates the deactivator 7d.

Figure 11:
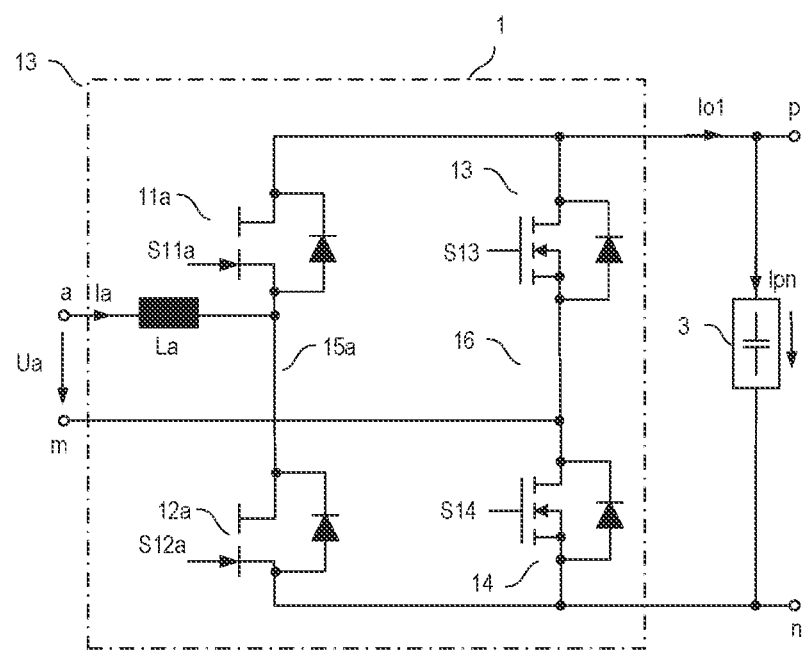
FIG. 11 shows a circuit diagram of a first power converter according to one example.

FIG. 11 shows one example of the first power converter 1. This first power converter 1 includes a bridge circuit with a first half-bridge comprising switches 11a, 12a and a second half-bridge with switches 13, 14. Each of these half-bridges includes a high-side switch 11a, 13 and a low-side switch 12a, 14, wherein the high-side switch 11a, 13 and the low-side switch 12a, 14 of each half-bridge form a series circuit connected between the DC link nodes p, n. Each of the half-bridges includes a tap 15a, 16, wherein the tap 15a, 16 is circuit node at which the high-side switch 11a, 13 and the low-side switch 12a, 14 of the respective half-bridge are connected. The taps 15a, 16 of the half-bridges are connected to the input a, m, wherein in the example shown in FIG. 11, the tap 15a of the first half-bridge 11a, 12a is connected to a first input node a and the tap 16 of the second half-bridge is connected to a second input node m of the input a, m. Furthermore, an inductor La is connected between one of the input nodes a, m and the respective tap 15a, 16. Just for the purpose of illustration, in the example shown in FIG. 9, the inductor La is connected between the first input node a and the tap 15a of the first half-bridge. The inductor La could also be connected between the second input node m and the tap 16 of the second half-bridge The high-side switches 11a, 13 and the low-side switches 12a, 14 of the half-bridges can be conventional electronic switches. According to one example, the electronic switches 11a, 12a of the first half-bridge are electronic switches optimized to have low switching losses. According to one example, these switches are operated at the switching frequency explained herein before. The electronic switches 13, 14 of the second half-bridge may be optimized to have low conduction losses. As will be explained in the following, these switches are operated with a switching frequency that is essentially given by the frequency of the input voltage Ua.

According to one example, each of the high-side switch 11a and the low-side switch 12a of the first half-bridge is a transistor based on wide band-gap semiconductor material such as, for example, a GaN (gallium nitride) based HEMT (High-Electron Mobility Transistor) or a silicon carbide (SiC) based MOSFET. According to one example, each of the high-side switch 13 and the low-side switch 14 of the second half-bridge is a silicon (Si) based MOSFET. According to one example, this MOSFET is a superjunction MOSFET.

The first power converter 1 shown in FIG. 11, in the forward mode, operates as a boost converter and, in the reverse mode, operates as a buck converter. In each case, the switches 11a, 12a of the first half-bridge are driven by pulse-width modulated (PWM) drive signals S11a, S12a in a complementary fashion such that only one of these switches 11a, 12a is switched on at the same time. The power transfer from the input a, m to the DC link nodes p, n in the forward mode and from the DC link nodes p, n to the input a, m in the reverse mode be regulated by suitably controlling the duty cycles of the PWM drive signals S11a, S12a.

In each of the forward mode and the reverse mode, one of the switches 13, 14 of the second half-bridge is switched on and the other one of the switches 13, 14 of the second half-bridge is switched off throughout a respective half-cycle of the input voltage Ua. This is also explained in further detail herein below.

According to one example, deactivating the first power converter 1 includes switching off each of the switches 11a, 12a, 13, 14 of the first and second half-bridge. Referring to FIG. 11, each of these switches 11a, 12a, 13, 14 includes a (passive) freewheeling element, which may be an internal or an external freewheeling element. Just for the purpose of illustration, these freewheeling elements are drawn as diodes in the example shown in FIG. 11. In a MOSFET, for example, the freewheeling element may be formed by an internal diode, which is usually referred to as body diode. In the deactivated state, these freewheeling elements make it possible that a current flows from the input a, m to the DC link nodes p, n when a surge pulse occurs, so that due to the surge pulse the DC link voltage Upn increases. In the normal operating mode, the freewheeling elements take over a current during dead times of the switched mode operation, that is, when one switch of a half-bridge has been switched off and the other switch has not yet been switched on.

FIG. 12 shows a block diagram of the forward mode controller 6f according to one example. This forward mode controller 6f is configured to regulate both the DC link voltage Upn* and the current waveform of the average input current Ia_avg. It should be noted that this block diagram illustrates functional blocks of the forward controller 6f rather than a specific implementation.

Referring to FIG. 12, the forward controller 6f receives the DC link voltage reference Upn* which defines a setpoint of the DC link voltage Upn and a measured DC link voltage Upn'. The measured DC link voltage Upn' is a signal that represents the DC link voltage Upn. The measured DC link voltage Upn' can be obtained by measuring the DC link voltage Upn in a conventional way using any kind of voltage measurement circuit (not shown). Referring to FIG. 12, a subtractor 61 subtracts the measured DC link voltage Upn' from the DC link voltage reference Upn* so that an output signal of the subtractor 61 represents a difference between the DC link voltage reference Upn* and the measured DC link voltage Upn'. This difference is also referred to as DC link voltage error in the following.

Referring to FIG. 12, a filter 62 receives the subtractor output signal and provides a filter output signal based on the DC link voltage error signal received from the subtractor 61. According to one example, the filter 62 has one of a proportional (P) characteristic, a proportional-integrative (PI) characteristic, a proportional-integrative-derivate (PID) characteristic, or the like. The filter output signal and the measured DC link voltage Upn' are received by a multiplier 63 which multiplies the filter output signal and the measured DC link voltage Upn' and provides a multiplier output signal Po*. This multiplier output signal Po* represents an average input power (over one period of the input voltage Ua) of the first power converter that is required to regulate the DC link voltage Upn such that a voltage level of the DC link voltage Upn essentially equals a voltage level represented by the DC link voltage reference Upn*.

Referring to FIG. 12, a divider 64 receives the multiplier output signal Po* and divides the multiplier output signal Po* by a signal $½·\hat{U}a^2$ that represents 0.5 times (½ times) the square of the amplitude $\hat{U}a$ of the input voltage Ua. An output signal G* of the divider 64 represents an overall desired conductance of the first power converter.

A further multiplier 65 receives the divider output signal G* and a magnitude |Ua'| of a measured input voltage Ua', wherein the measured input voltage Ua' is a signal that represents the input voltage Ua, wherein this voltage is either positive or negative. This measured input voltage Ua' may be obtained by measuring the input voltage Ua using any kind of conventional voltage measurement circuit. An output signal Ia* of the further multiplier 65 represents an input current reference. That is, this multiplier output signal Ia* represents a magnitude of a desired instantaneous current level of the input current Ia that is required in order to regulate the DC link voltage Upn such that the voltage level of the DC link voltage Upn essentially equals the voltage level represented by the DC link voltage reference Upn*.

Referring to FIG. 12, a further subtractor 66 receives the input current reference Ia* and a magnitude |Ia'| of a measured input current Ia', wherein the measured input current Ia' is a signal that represents an instantaneous current level of the input current Ia. The measured input current value Ia' may be obtained by measuring the input current Ia using any kind of current measurement circuit.

An output signal of the further subtractor 66 represents a current error, that is, the output signal represents a difference between the input current reference Ia* and the magnitude |Ia'| of the measured input current Ia'. This current error signal is received by a further filter 67, which may have one of a PI characteristic, a PID characteristic, or the like. An output of the further filter 67 represents a duty cycle d.

Optionally, a limiter 68 is connected downstream the further filter 67 and is configured to limit the duty cycle d to a range of between 0 and 1. When an input power drawn by the second power converter 2 from the DC link nodes p, n rapidly chances, the instantaneous input current Ia may significantly deviate from the input current reference Ia*. This may have the effect that the output signal of the further filter 67 falls below 0 or rises above 1 for a short time period, and, therefore, is outside an acceptable duty cycle range that can be processed by a PWM modulator 69 that receives the signal representing the duty cycle d.

Referring to FIG. 12, the PWM modulator 69 receives the duty cycle signal d and the measured input voltage Ua'. The PWM modulator 69 is configured to generate the drive signals S11a, S12a, S13, S14 of the electronic switches 11a, 12a, 13, 14 in the first power converter 1 based on the duty cycle signal d and the measured input voltage Ua'. More specifically, the PWM modulator 69 is configured to generate the drive signals S11a, S12a, S13, S14 based on the duty cycle signal d and a polarity of the input voltage Ua. wherein information on the polarity of the input voltage Ua is obtained from the measured input voltage Ua'.

FIGS. 13A and 13B illustrate one example of how the PWM modulator 69 may generate these drive signals S11a, S12a, S13, S14 based on the duty cycle d and the polarity of the input voltage Ua. More specifically, FIGS. 13A and 13B show signal diagrams of the drive signals S11a, S12a, S13, S14 during one drive cycle having the duration Tsw (=1/fsw, wherein fsw is the switching frequency of the switches 11a, 12a in the first half-bridge), wherein FIG. 13A shows signal diagrams of the drive signals S11a, S12a, S13, S14 when the input voltage Ua is positive (Ua>0) and FIG. 13B shows signal diagrams of the drive signals S11a, S12a, S13, S14 when the input voltage Ua is negative (Ua<0). Just for the purpose of explanation, in FIGS. 13A and 13B, a high signal level of a respective drive signal S11a, S12a, S13, S14 is a signal level that switches on the respective switch 11a, 12a, 13, 14 and a low signal level of a respective drive signal S11a, S12a, S13, S14 is a signal level that switches off the respective switch 11a, 12a, 13, 14.

Referring to FIG. 13A, the PWM modulator 69 switches on the high-side switch 13 and switches off the low-side switch 14 of the second half-bridge when the input voltage Ua is positive, that is, during the positive half-cycle (half-wave) of the input voltage Ua. Furthermore, the PWM modulator 69 operates the low-side switch 12a of the first half-bridge in a PWM fashion such that the low-side switch 12a is switched for an on-time Ton12 in each drive cycle, wherein a ratio Ton12/Tsw between the on-time Ton12 and the duration Tsw of the drive cycle is proportional to the duty cycle d, that is, Ton12/Tsw~d. During the on-time Ton12 of the low-side switch 12a, energy is stored in the inductor La, and the energy stored in the inductor La is transferred to the DC link nodes during a subsequent off-time Toff12 via the high-side switch 11a. During the off-time Toff12 of the low-side switch 12a the high-side switch 11a may be switched on (as illustrated in dashed lines), wherein there may be a dead time between switching off one of these switches 11a, 12a and switching on the other one of these switches 11a, 12a. Alternatively, the high-side switch 11a remains off during the positive half-wave of the input voltage Ua, so that the freewheeling element of the high-side switch 11a takes over the current during the off-time Toff12 of the low-side switch 12a Summarizing the above, the input power of the first power converter 1 in the normal mode and during positive half-waves of the input voltage Ua is governed by a PWM operation of the low-side switch 12a of the first half-bridge. The high-side switch 11a may be operated as a synchronous rectifier or may remain switched off.

Referring to FIG. 13B, the PWM modulator 69 switches on the low-side switch 14 and switches off the high-side switch 13 of the second half-bridge when the input voltage Ua is negative that is, during the negative half-cycle (half-wave) of the input voltage Ua. Furthermore, the PWM modulator 69 operates the high-side switch 11a of the first half-bridge in a PWM fashion such that the high-side switch 11a is switched for an on-time Ton11 in each drive cycle, wherein a ratio Ton11/Tsw between the on-time Ton11 and the duration Tsw of the drive cycle is proportional to the duty cycle d, that is, Ton11/Tsw~d. During the on-time Ton11 of the high-side switch 11a, energy is stored in the inductor La, and the energy stored in the inductor La is transferred to the DC link nodes during a subsequent off-time Toff11 via the low-side switch 12a. During the off-time Toff11 of the high-side switch 11a the low-side switch 12a may be switched on (as illustrated in dashed lines), wherein there may be a dead time between switching off one of these switches 11a, 12a and switching on the other one of these switches 11a, 12a. Alternatively, the low-side switch 12a remains off during the negative half-wave of the input voltage Ua, so that the freewheeling element of the low-side switch 12a takes over the current during the off-time Toff11 of the high-side switch 11a. Summarizing the above, the input power of the first power converter 1 in the normal mode and during negative half-waves of the input voltage Ua is governed by a PWM operation of the high-side switch 11a of the first half-bridge. The low-side switch 12a may be operated as a synchronous rectifier or may remain switched off.

According to one example, the reverse mode controller 6r, which controls operation of the first power converter 1 in the reverse mode, also causes the first power converter 1 to operate as a PFC converter, so that an average current Ia_avg fed back into the power grid is in phase with the input voltage Ua or has a given phase difference relative to the phase of the input voltage Ua. One example of a reverse mode controller 6r of this type is shown in FIG. 14.

The reverse mode controller 6r shown in FIG. 14 is similar to the forward mode controller shown in FIG. 12 and includes a multiplier 75 that receives the magnitude |Ua'| of the measured input voltage Ua' and a conductance parameter Gr*, which represents a desired conductance of the first power converter 1 in the reverse mode, so that an output −Ia* of the multiplier 75 represents a current reference of the current Ia that is to be fed back into the power grid. This current Ia flows in a direction opposite the current direction in the forward mode. The conductance parameter Gr* may be fixed, so that the current Ia has the same amplitude $\hat{I}a = Gr^* \cdot \hat{U}a$ throughout the reverse operating mode. Alternatively, conductance parameter Gr* may vary dependent on the DC link voltage Upn so that, for example, the higher the DC link voltage Upn, the higher the current amplitude $\hat{I}a$.

Referring to FIG. 14, a subtractor 76 receives the current reference −Ia* and a magnitude |Ia'| of the measured input current Ia', wherein the measured input current Ia' is a signal that represents an instantaneous current level of the (negative) input current Ia. The measured input current Ia' may be obtained by measuring the input current Ia using any kind of current measurement circuit. An output signal of the subtractor 76 represents a current error, that is, the output signal represents a difference between the input current reference −Ia* and the magnitude |Ia'| of the measured input current Ia'. This current error signal is received by a further filter 77, which may have one of a PI characteristic, a PID characteristic, or the like. An output of the further filter 77 represents a duty cycle d. Optionally, a limiter 78 is connected downstream the further filter 77 and is configured to limit the duty cycle d to a range of between 0 and 1.

Referring to FIG. 14, a PWM modulator 79 receives the duty cycle signal d and the measured input voltage Ua'. The PWM modulator 79 is configured to generate the drive signals S11a, S12a, S13, S14 of the electronic switches 11a, 12a, 13, 14 in the first power converter 1 based on the duty cycle signal d and the polarity of the input voltage Ua. FIGS. 15A and 15B illustrate one example of how the PWM modulator 79 may generate these drive signals S11a, S12a, S13, S14 based on the duty cycled and the polarity of the input voltage Ua. More specifically, FIGS. 15A and 15B show signal diagrams of the drive signals S11a, S12a, S13, S14 during one drive cycle having the duration Tsw (=1/fsw, wherein fsw is the switching frequency of the switches 11a, 12a in the first half-bridge), wherein FIG. 15A shows signal diagrams of the drive signals S11a, S12a, S13, S14 when the input voltage Ua is positive (Ua>1) and FIG. 15B shows signal diagrams of the drive signals S11a, S12a, S13, S14 when the duty input voltage Ua is negative (Ua>0). Just for the purpose of explanation, in FIGS. 15A and 15B, a high signal level of a respective drive signal S11a, S12a, S13, S14 is a signal level that switches on the respective switch 11a, 12a, 13, 14 and a low signal level of a respective drive signal S11a, S12a, S13, S14 is a signal level that switches off the respective switch 11a, 12a, 13, 14.

Referring to FIG. 15A, the PWM modulator 69 switches on the low-side switch 14 and switches off the high-side switch 14 of the second half-bridge when the input voltage Ua is positive, that is, during the positive half-cycle (half-wave) of the input voltage Ua. Furthermore, the PWM modulator 79 operates the high-side switch 11a of the first half-bridge in a PWM fashion such that the high-side switch 11a is switched for an on-time Ton11 in each drive cycle, wherein a ratio Ton11/Tsw between the on-time Ton11 and the duration Tsw of the drive cycle is proportional to the duty cycle, that is, Ton11/Tsw~d. During the on-time Ton11 of the high-side switch 12a, energy is stored in the inductor La, and the energy stored in the inductor La is transferred to input a, m during a subsequent off-time Toff11. During the off-time Toff11 of the high-side switch 11a the low-side switch 12a may be switched on (as illustrated in dashed lines), wherein there may be a dead time between switching off one of these switches 11a, 12a and switching on the other one of these switches 11a, 12a. Alternatively, the low-side switch 12a remains off during the positive half-wave of the input voltage Ua, so that the freewheeling element of the low-side switch 12a takes over the current during the off-time Toff11 of the high-side switch 11a. Summarizing the above, the power fed back into the grid in the reverse mode and during positive half-waves of the input voltage Ua is governed by a PWM operation of the high-side switch 11a of the first half-bridge. The low-side switch 12a may be operated as a synchronous rectifier or may remain switched off.

Referring to FIG. 15B, the PWM modulator 79 switches on the high-side switch 13 and switches off the low-side switch 14 of the second half-bridge when the input voltage Ua is negative, that is, during the negative half-cycle (half-wave) of the input voltage Ua. Furthermore, the PWM modulator 79 operates the low-side switch 12a of the first half-bridge in a PWM fashion such that the low-side switch 12a is switched for an on-time Ton12 in each drive cycle, wherein a ratio Ton12/Tsw between the on-time Ton12 and the duration Tsw of the drive cycle is proportional to the duty cycle, that is, Ton12/Tsw~d. During the on-time Ton12 of the low-side switch 12a, energy is stored in the inductor La, and the energy stored in the inductor La is transferred to the input a, m during a subsequent off-time Toff12. During the off-time Toff12 of the low-side switch 12a the high-side switch 11a may be switched on (as illustrated in dashed lines), wherein there may be a dead time between switching off one of these switches 11a, 12a and switching on the other one of these switches 11a, 12a. Alternatively, the high-side switch 11a remains off during the negative half-wave of the input voltage Ua, so that the freewheeling element of the high-side switch 11a takes over the current during the off-time Toff12 of the low-side switch 11a. Summarizing the above, the power fed back into the grid in the reverse mode and during negative half-waves of the input voltage Ua is governed by a PWM operation of the low-side switch 12a of the first half-bridge. The high-side switch 11a may be operated as a synchronous rectifier or may remain switched off.

Implementing the first power converter 1 as a single phase (1-phase) converter as shown in FIG. 11 is only an example. According to another example illustrated in FIG. 16, the first power converter 1 is a 3-phase power converter that includes three phases, wherein each of these phases receives one of three input voltages Ua, Ub, Uc at a respective input node a, b, c, wherein the input voltages Ua, Ub, Uc are referenced to the reference node (ground node) m. According to one example, the input voltages Ua, Ub, Uc received by the first power converter are alternating input voltages such as sinusoidal input voltages. A phase shift between each pair of these input voltages Ua, Ub, Uc is different from 0°, for example.

Figure 17:
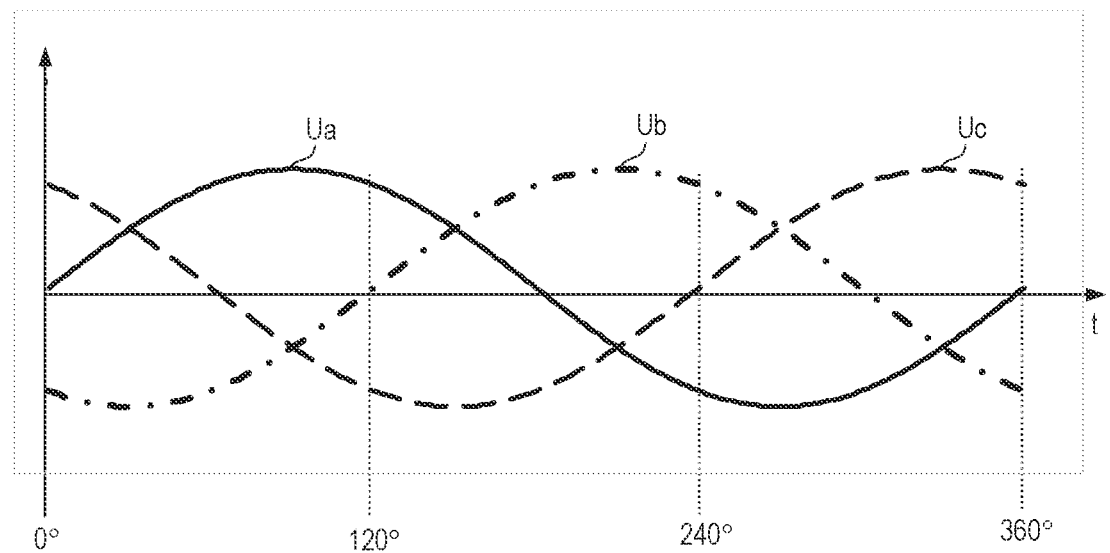
FIG. 17 shows signal waveforms of input voltages that may be received by the first power converter shown in FIG. 16.

FIG. 17 shows signal diagrams of sinusoidal input voltages Ua, Ub, Uc during one period of each of these input voltages Ua, Ub, Uc. In this example, the phase shift between each pair of these input voltages Ua, Ub, Uc is 120° (2π/3). The three input voltages Ua, Ub, Uc may have essentially the same frequency. This frequency is between 50 Hz and 60 Hz, for example. Each of these input voltages Ua, Ub, Uc is a $230V_{RMS}$ voltage or $110V_{RMS}$ voltage, for example.

Figure 16:
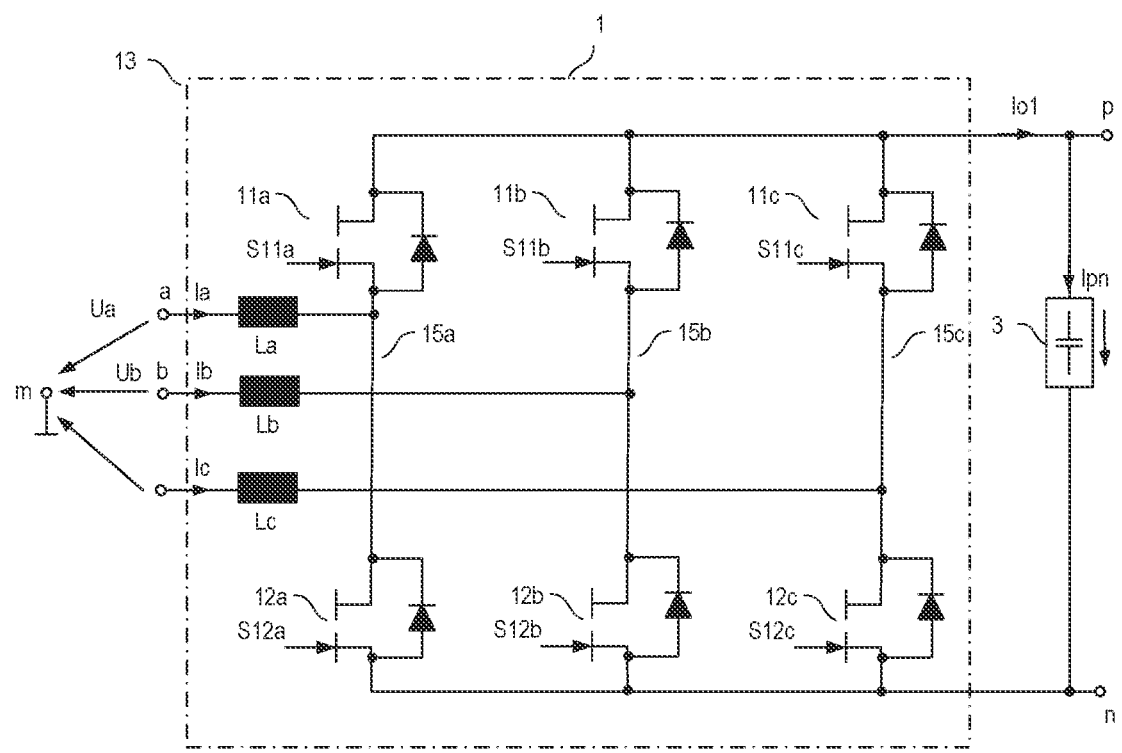
FIG. 16 shows a first power converter according to another example.

Referring to FIG. 16, each of the three phases is implemented in the same way as the single phase shown in FIG. 11 and includes a half-bridge with a high-side switch 11a, 11b, 11c, a low-side switch 12a, 12b, 12c, and a tap 15a, 15b, 15c. The high-side switch 11a, 11b, 11c and the low-side switch 12a, 12b, 12c of each half-bridge are connected in series between the DC link nodes p, n. Furthermore, each of the taps 15a, 15b, 15c is connected to a respective one of the three input nodes a, b, c via a respective inductor La, Lb, Lc. A half-bridge 13, 14 of the type shown in FIG. 11 is not required in the 3-phase converter.

Figure 18:
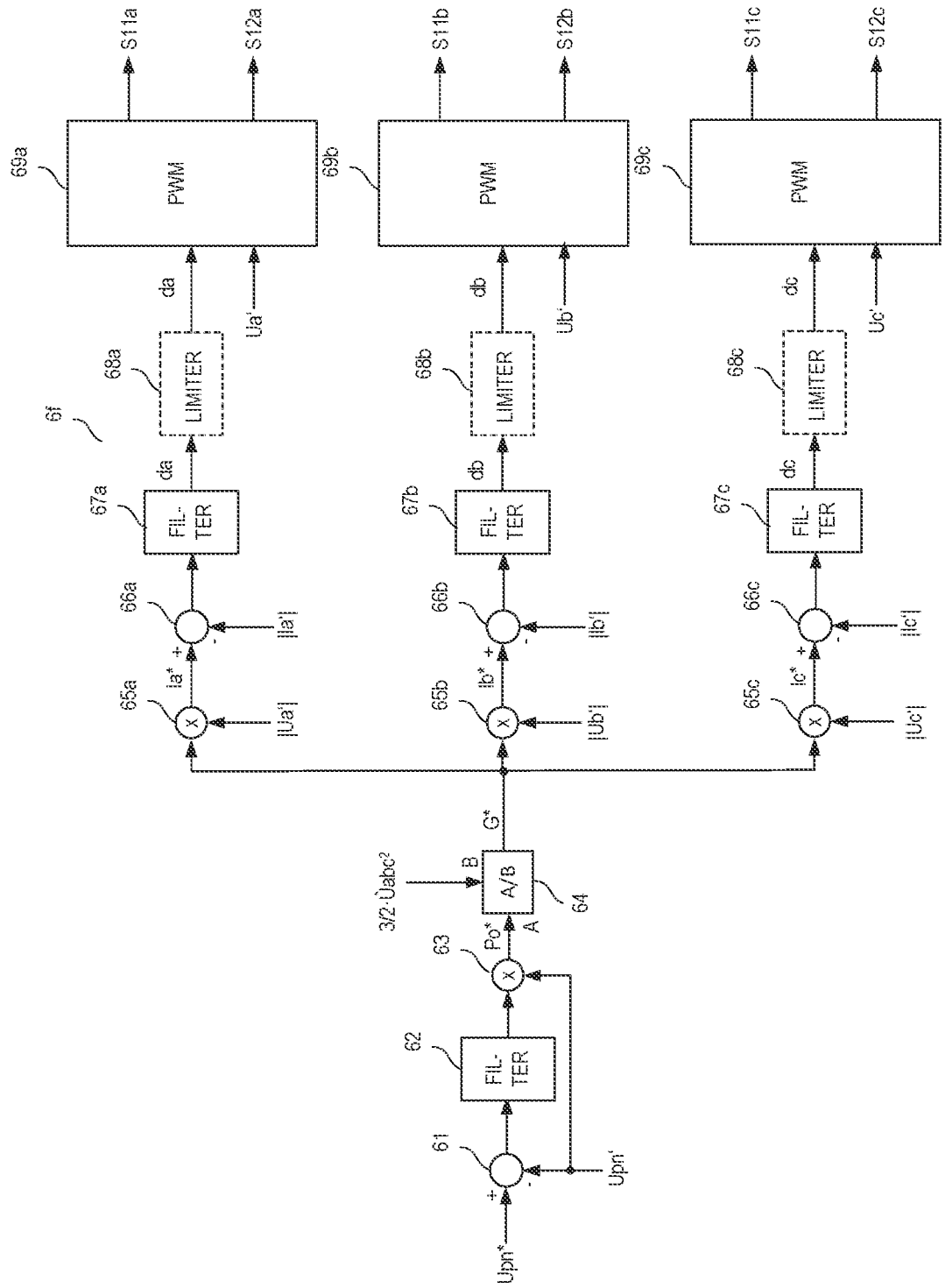
FIG. 18 shows one example of a forward mode controller of the first power converter shown in FIG. 16.

The 3-phase converter shown in FIG. 16 can be operated in a forward mode and a reverse mode in a way similar to the single phase converter. One example of a forward mode controller 6f configured to operate the 3-phase converter in the forward mode is illustrated in FIG. 18. This controller 6f is based on the forward mode controller 6f illustrated in FIG. 12 and includes the subtractor 61, the filter 62, the multiplier 63, and the divider explained with reference to FIG. 11. Different from the forward mode controller 6f illustrated in FIG. 11, the divider 64 in the forward mode controller 6f according to FIG. 18 divides the output power reference by ³⁄₂Ûabc, wherein Ûabc is the amplitude of the three input voltages Ua, Ub, Uc, so that Ûabc=Ûa=Ûb=Ûc. The divider output signal G*, which represents an overall desired conductance of the first power converter 1 is received by each of three branches of the forward mode controller 6f, wherein each of these three branches is configured to control operation of a respective one of the phases of the first power converter 1.

Referring to FIG. 18, each of these three branches includes a multiplier 65a, 65b, 65c that receives the divider output signal G* and the magnitude |Ua'|, |Ub'|, |Uc'| of a measured input voltage Ua', Ub', Uc'. The magnitude |Ua'|, |Ub'|, |Uc'| of the measured input voltage Ua', Ub', Uc' received by the multiplier 65a, 65b, 65c in each branch is a signal that represents the magnitude |Ua|, |Ub|, |Uc| of the input voltage Ua, Ub, Uc received by the phase controlled by the respective branch. The measured input voltages Ua', Ub', Uc' may be obtained by measuring the input voltage Ua, Ub, Uc using any kind of conventional voltage measurement circuit. An output signal Ia*, Ib*, Ic* of each multiplier 65a, 65b, 65c represents an input current reference of the respective phase. That is, the multiplier output signals Ia*, Ib*, Ic* represent desired instantaneous current levels of the input currents I, Ib, Ic received by the three phases and that are required to regulate the DC link voltage Upn such that the voltage level of the DC link voltage Upn essentially equals the voltage level represented by the DC link voltage reference Upn*.

Referring to FIG. 18, in each branch, a further subtractor 66a, 66b, 66c receives the input current reference Ia*, Ib*, Ic* and the magnitude |Ia'|, |Ib'|, |Ic'| of a measured input current Ia', Ib', Ic' wherein the magnitude |Ia'|, |Ib'|, |Ic'| of the measured input current Ia', Ib', Ic' is a signal that represents the magnitude |Ia'|, |Ib'|, |Ic'| of an instantaneous current level of the input current Ia, Ib, Ic in each phase. The measured input current value Ia' may be obtained by measuring the input current Ia using any kind of current measurement circuit. An output signal of each subtractor 66a, 66b, 66c represents a current error, that is, a difference between the input current reference Ia*, Ib*, Ic* and the respective measured input current Ia', Ib', Ic'. In each branch, this current error signal is received by a further filter 67a, 67b, 67c, which may have one of a PI characteristic, a PID characteristic, or the like. An output of each further filter 67a, 67b, 67c represents a duty cycle da, db, dc.

Optionally, in each branch, a limiter 68a, 68b, 68c is connected downstream the further filter 67a, 67b, 67c and is configured to limit the respective duty cycle da, db, dc to a range of between 0 and 1.

Referring to FIG. 18, each branch of the forward mode controller 6f includes a PWM modulator 69a, 69b, 69c that receives the respective duty cycle signal da, db, dc and the respective measured input voltage Ua', Ub', Uc'. Each of these PWM modulators 69a, 69b, 69c is configured to control operation of the half-bridge in one phase. That is, PWM modulator 69a in the first branch controls operation of the switches 11a, 12a in the first phase by generating corresponding drive signals S11a, S12a, PWM modulator 69b in the second branch controls operation of the switches 11b, 12b in the second phase by generating corresponding drive signals S11b, S12b, and PWM modulator 69c in the third branch controls operation of the switches 11c, 12c in the third phase by generating corresponding drive. Each of these PWM modulators 69a, 69b, 69c generates the respective drive signals S11a, S11b, S11c, S12a, S12b, S12c based on the respective duty cycle signal da, db, dc and the respective measured input voltage Ua', Ub', Uc' in the same way as the PWM modulator 69 explained with reference to FIGS. 12, 13A, and 13B generates the drive signals S11a, S12a based on the duty cycle signal d.

Figure 19:
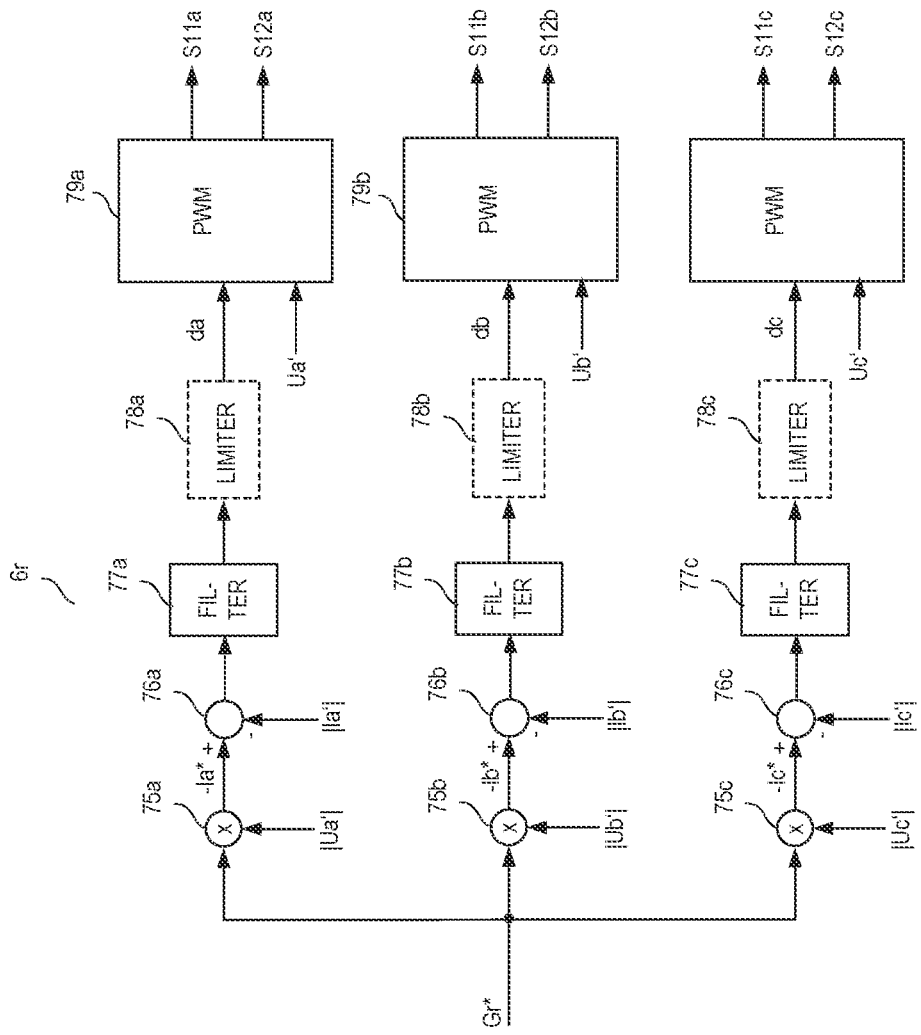
FIG. 19 shows one example of a reverse mode controller of the power converter shown in FIG. 16.

One example of a reverse mode controller 6r configured to operate the 3-phase converter shown in FIG. 16 in the reverse mode is illustrated in FIG. 19. This controller 6r is based on the reverse mode controller 6r illustrated in FIG. 14 and includes three branches, wherein each of these branches controls operation of a respective one of the three phases.

Referring to FIG. 19, each branch includes a multiplier 75a, 75b, 75c that receives the conductance parameter Gr* and the magnitude |Ua'|, |Ub'|, |Uc'| of a measured input voltage Ua', Ub', Uc', wherein each of these magnitudes |Ua'|, |Ub'|, |Uc'| represents the magnitude |Ua|, |Ub|, |Uc| of a respective one of the three input voltages Ua, Ub, Uc. An output −Ia*, −Ib*, −Ic* of each multiplier 75a, 75b, 75c represents a current reference of the current Ia, Ib, Ic that is to be fed back into the power grid by each phase. These currents Ia, Ib, Ic flow in directions opposite the current directions in the forward mode.

Referring to FIG. 19, in each phase, a subtractor 76a, 76b, 76c receives the respective current reference −Ia*, −Ib*, −Ic* and the magnitude |Ia'|, |Ib'|, |Ic'| of a respective measured input current Ia', Ib', Ic' wherein the measured input current Ia', Ib', Ic' is a signal that represents an instantaneous current level of the respective (negative) input current Ia, Ib, Ic. The measured input current Ia', Ib', Ic' may be obtained by measuring the respective input current Ia, Ib, Ic using any kind of current measurement circuit. An output signal of each subtractor 76a, 76b, 76c represents a current error, that is, a difference between the input current reference −Ia*, −Ib*, −Ic* and the magnitude |Ia'|, |Ib'|, |Ic'| of the measured input current Ia', Ib', Ic'. In each branch, this current error signal is received by a further filter 77a, 77b, 77c, which may have one of a PI characteristic, a PID characteristic, or the like. An output of the further filter 77a, 77b, 77c represents a duty cycle da, db, dc. Optionally, a limiter 78a, 78b, 78c is connected downstream the further filter 77a, 77b, 77c and is configured to limit the duty cycle da, db, dc to a range of between 0 and 1.

Referring to FIG. 19, in each branch, a PWM modulator 79a, 79b, 79c receives the duty cycle signal da, db, dc and the measured input voltage Ua', Ub', Uc' and is configured to control operation of the half-bridge in one phase. That is, PWM modulator 79a in the first branch controls operation of the switches 11a, 12a in the first phase by generating corresponding drive signals S11a, S12a, PWM modulator 79b in the second branch controls operation of the switches 11b, 12b in the second phase by generating corresponding drive signals S11b, S12b, and PWM modulator 79c in the third branch controls operation of the switches 11c, 12c in the third phase by generating corresponding drive. Each of these PWM modulators 79a, 79b, 79c generates the respective drive signals S11a, S11b, S11c, S12a, S12b, S12c based on the respective duty cycle signal da, db, dc and the respective measured input voltage Ua', Ub', Uc' in the same way as the PWM modulator 79 explained with reference to FIGS. 14, 15A, and 15B generates the drive signals S11a, S12a based on the duty cycle signal d.

Referring to the above, a second half-bridge with switches 13, 14 of the type shown in FIG. 11 is not required in a three-phase converter of the type shown in FIG. 16, in which the sum of the input currents Ia, Ib, Ic is zero. Thus, each of the PWM modulators 69A-69c and 79a-79c only controls the switches of one respective half-bridge.

It should be noted that the first power converter 1 is not restricted to be implemented in accordance with the examples shown in FIGS. 11 and 16. Instead, the first power converter 1 may be implemented based on each type of topology that allows for a bidirectional operation, so that in the normal mode energy can be transferred from the power grid to the DC link nodes p, n and in the surge mode energy can be transferred from the DC link nodes p, n to the power grid. Another suitable topology includes, for example, a bipolar clamped neutral point converter.

Figure 20:
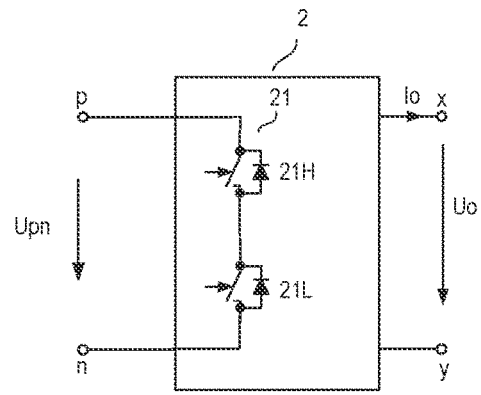
FIG. 20 shows one example of the second power converter.

The second power converter 2 can be implemented with any kind of DC/DC converter topology. According to one example, illustrated in FIG. 20, the DC/DC converter includes at least one half-bridge with a high-side switch 21H and a low-side switch 21L connected in series between the DC link nodes p, n. According to one example, deactivating the second power converter 2 in the surge mode includes switching off each of the high-side switch 21H and the low-side switch 21L. In this case, the voltage across each of the high-side switch 21H and the low-side switch 21L approximately equals 50% of the DC link voltage Upn. According to one example, the high-side switch 21H and the low-side switch 21L are selected such that they have a voltage blocking capability that is between 50% and 60% of the maximum DC link voltage that can be expected. According to one example the voltage blocking capability of each of the high-side switch 21H and the low-side switch 21L is between 800V and 1200V.

Optionally, as illustrated in dashed lines in FIG. 1, an overvoltage protection circuit OVP is connected between the DC link nodes x, y and is configured to limit (clamp) the DC link voltage to a clamping voltage level that is higher than the first voltage threshold Uth1 and that is lower than a voltage blocking capability at the input of the second power converter 2 in the deactivated state. The overvoltage protection circuit OVP can be implemented in a conventional way and may include Zener diodes, Zener diodes combined with an MOV (metal-oxide varistor), a gas discharge device, or the like. In the event that the second power converter 2 includes a half-bridge with two switches each having a voltage blocking capability of U21, the clamping voltage level is between 1.8 times and 1.99 times the voltage blocking capability U21, for example.

Figure 21:
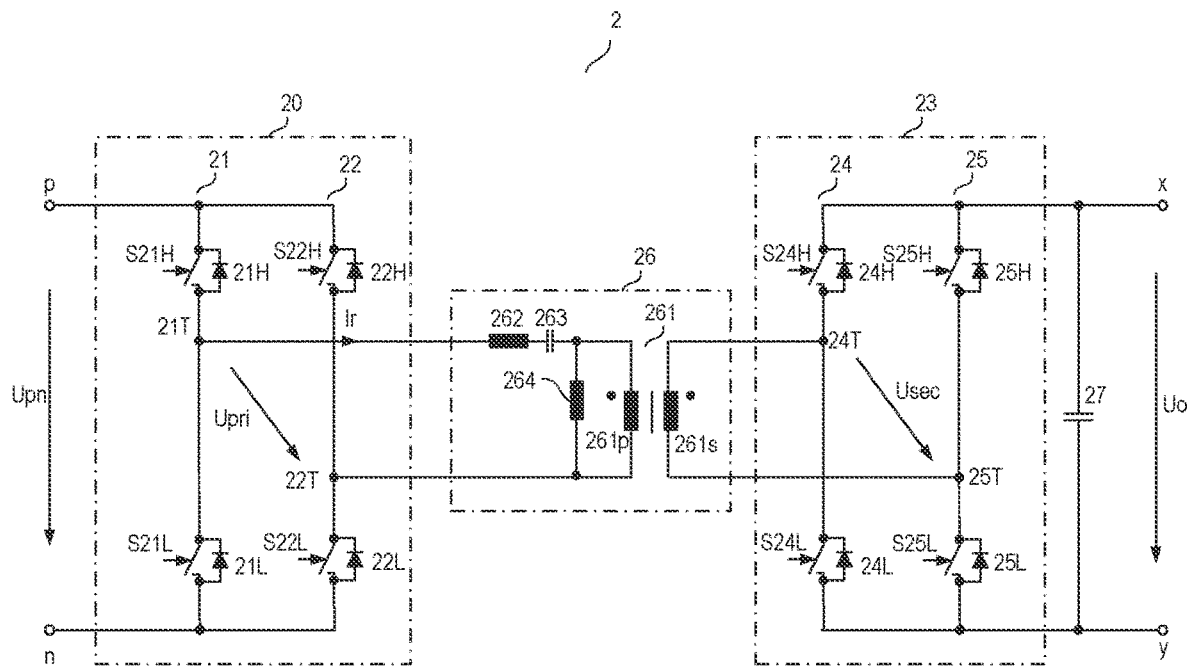
FIG. 21 shows one example of a second power converter implemented as an LLC converter.
Figure 21:
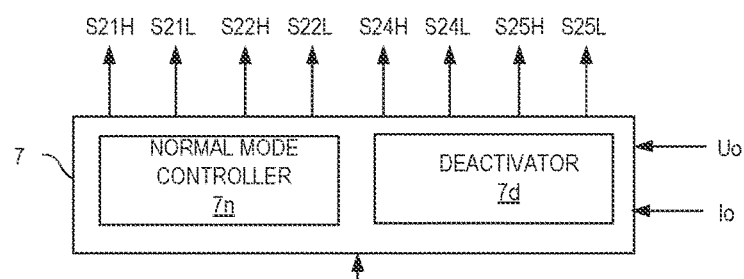

Referring to the above, the second power converter 2 can be implemented with any kind of DC/DC converter topology. Just for the purpose of illustration, one example of a second power converter 2 is illustrated in FIG. 21. This second power converter is implemented as an LLC converter and includes a first bridge circuit 20, a second bridge circuit 23, and a resonant circuit (resonant tank) 26. The first bridge circuit 20 is connected between the DC link nodes p, n and the resonant circuit 26, and the second bridge circuit 23 is connected between the resonant circuit 26 and the output nodes x, y. The first bridge circuit 20 includes a first half-bridge 21 and a second half-bridge 22, each including a high-side switch 21H, 22H and a low-side switch 21L, 22L. The high-side switch 21H, 22H and the low-side switch 21L, 22L of each of the first and second half-bridges 21, 22 are connected in series between the DC link nodes p, n. Further, each of the first and second half-bridges 21, 22 includes a tap 21T, 22T, which is a circuit node between the high-side switch 21H, 22H and the low-side switch 21L, 22L of the respective half-bridge 21, 22. The tap 21T of the first half-bridge 21 is connected to a first input node of the resonant circuit 26 and the tap 22T of the second half-bridge 22 is connected to a second input node of the resonant circuit 26.

The second bridge circuit 23 includes a first half-bridge 24 and a second half-bridge 25 each including a high-side switch 24H, 25H and a low-side switch 24L, 25L. The high-side switch 24H, 25H and the low-side switch 24L, 25L of each of these half-bridges 24, 25 are connected in series between the output nodes x, y. Further, each of the first and second half-bridges 24, 25 of the second bridge circuit 23 includes a tap 24T, 25T, which is a circuit node between the high-side switch 24H, 25H and the low-side switch 24L, 25L of the respective bridge circuit 24, 25. The tap 24T of the first half-bridge 24 is connected to a first output node of the resonant circuit 26, and the tap 25T of the second half-bridge 25 is connected to a second output node of the resonant circuit 26.

Referring to FIG. 21, the resonant circuit 26 includes a transformer 261 with a primary winding 261p and a secondary winding 261s, wherein the primary winding 261p and the secondary winding 261s are inductively coupled and have the same winding sense. Further, the resonant circuit 26 includes a series circuit with an inductor 262 and a capacitor 263 connected in series with the primary winding 261p of the transformer 261. The series circuit including the inductor 262, the capacitor 263 and the primary winding 261p is connected between the input nodes of the resonant circuit 26 and, therefore, between the tap 21T of the first half-bridge 21 and the tap 22T of the second half-bridge 22. The resonant circuit further includes a further inductor 264 connected in parallel with the primary winding 261p of the transformer 261.

Furthermore, the second controller 7 is configured to control operation of the second power converter by controlling operation of the high-side switches 21H, 22H, 24H, 25H and the low-side switches 21L, 22L, 24L, 25L of the bridge circuits 20, 23. In the surge mode, the second controller 7 switches off at least the high-side switches 21H, 22H and the low-side switches low-side 21L, 22L switch of the first bridge circuit 20 in order to deactivate the second power converter 2. In the normal mode, the second controller 7 controls operation of the first bridge circuit 20 such that an alternating voltage Upri is generated based on the DC link voltage and applied to the resonant circuit 26 and controls operation of the second bridge circuit 23 such that an alternating voltage Usec available at the output of the resonant circuit 26 is rectified and the output voltage Uo and the output current Io are generated. The output voltage Uo and the output current Io are regulated, for example, by controlling a frequency of the alternating voltage Upri based on at least one of a measured output voltage Uo or a measured output current Io received by the second controller 7.

It should be noted that implementing the second power converter 7 as an LLC converter is only example. A variety of other types of DC/DC converter may be used as well. Examples include, but are not restricted, an interleaved two-transistor forward converter, a phase-shift ZVS (zero voltage switching) converter, or a series resonant converter. The latter may be obtained based on the LLC converter shown in FIG. 21 by omitting the further inductor 264.

The DC link capacitor circuit 3 includes at least one capacitor connected between the DC link nodes p, n and may be implemented in various ways. Two different examples are illustrated in FIGS. 22A and 22B. According to one example illustrated in FIG. 22A, the DC link capacitor circuit 3 includes a single capacitor 31 connected between the DC link nodes p, n. According to another example illustrated in FIG. 22B, the DC link capacitor circuit 3 includes a first DC link capacitor 32 and a second DC link capacitor 33 that are connected in series between the DC link nodes p, n, and a tap 34, The tap 34 is a circuit node between the first DC link capacitor 132 and the second DC link capacitor 133. In each case, the DC link voltage Upn is the voltage between the two DC link nodes p, n.

When the DC link capacitor circuit 3 is implemented as illustrated in FIG. 22B, the second power converter may include a first sub-converter connected to the first capacitor 32 and a second sub-converter connected to the second capacitor 33. These sub-converters may generate one common output voltage Uo or may generate separate output voltages. When implemented with two sub-converters, deactivating the second power converter 2 in the surge mode includes deactivating both sub-converters.

Although the present disclosure is not so limited, the following numbered examples demonstrate one or more aspects of the disclosure.

Example 1. A method including: operating a power converter arrangement in a surge mode, when a DC link voltage of the power converter arrangement reaches a first voltage threshold, wherein the power converter arrangement includes: a first power converter including an input and an output; a second power converter including an input and an output; and a DC link capacitor circuit coupled to the output of the first power converter and the input of the second power converter and providing the DC link voltage, and wherein operating the power converter arrangement in the surge mode includes: deactivating the second power converter; and at least temporarily, operating the first power converter in a reverse mode to transfer energy from the DC link capacitor circuit to the input of the first power converter.

Example 2. The method of example 1, wherein deactivating the second power converter includes deactivating the second power converter when the DC link voltage reaches the first voltage threshold, and wherein operating the first power converter in the reverse mode includes monitoring an operating parameter of the power converter arrangement and operating the first power converter in the reverse mode when the monitored operating parameter meets a predefined criterion.

Example 3. The method of example 2, wherein the operating parameter is an output current of the first power converter, and wherein the predefined criterion is met when the output current reaches a predefined current threshold.

Example 4. The method of example 3, wherein the predefined current threshold is zero.

Example 5. The method of example 2, wherein the operating parameter is the DC link voltage, and wherein the predefined criterion is met when a time derivative of the DC link voltage reaches a predefined threshold.

Example 6. The method of example 5, wherein the predefined threshold is zero.

Example 7. The method of example 1, further including: changing from the surge mode to a normal operating mode of the power converter arrangement when the DC link voltage falls below a second voltage threshold, wherein operating the power converter arrangement in the normal operating mode includes: transferring energy, by the first power converter, from the input of the first power converter to the output of the first power converter; and transferring energy, by the second power converter, from the input of the second power converter to the output of the second power converter.

Example 8. The method of example 7, wherein transferring energy, by the first power converter, from the input of the first power converter to the output of the first power converter include regulating the DC link voltage, and wherein transferring energy, by the second power converter, from the input of the second power converter to the output of the second power converter includes regulating one of an output voltage or an output current of the second power converter.

Example 9. The method of example 2, wherein the second voltage threshold is equal to or smaller than the first voltage threshold.

Example 10. The method of any one of the preceding examples, wherein the power converter has a DC link voltage reference, and wherein the first voltage threshold is at least 10% higher than the DC link voltage reference.

Example 11. The method of any one of the preceding examples, wherein the second power converter includes at least one half-bridge with two electronic switches, wherein the at least one half-bridge is coupled to the input of the second power converter, and wherein deactivating the second power converter includes switching off the two electronic switches of the at least one half-bridge.

Example 12. The method according to any one of the preceding examples, wherein the first power converter is an AC/DC converter and the second power converter is a DC/DC converter.

Example 13. The method of example 12, wherein the first power converter is a PFC converter.

Example 14. The method of example 12, wherein the second power converter is selected from the group consisting of: an LLC converter; a phase shift ZVS converter; and a two-transistor-forward converter.

Example 15. A controller configured to operate a power converter arrangement in a surge mode, when a DC link voltage of the power converter arrangement reaches a first voltage threshold, wherein operating the power converter arrangement in the surge mode includes: at least temporarily, operating a first power converter of the power converter arrangement in a reverse mode to transfer energy from a DC link capacitor circuit, across which the DC link voltage is available, to an input of the power converter arrangement; and deactivating a second power converter coupled between the DC link capacitor circuit and an output of the power converter arrangement.

Example 16. A power converter arrangement, including: a first power converter including an input and an output; a second power converter including an input and an output; a DC link capacitor circuit coupled to the output of the first power converter and the input of the second power converter; and a controller according to example 15.

Example 17. A power converter arrangement, including: a first power converter including an input and an output; a second power converter including an input and an output; a DC link capacitor circuit coupled to the output of the first power converter and the input of the second power converter; and a control circuit configured to operate the power converter arrangement in a surge mode when a DC link voltage across the DC link capacitor circuit reaches a first voltage threshold, wherein operating the power converter arrangement in the surge mode includes: at least temporarily, deactivating the second power converter; and operating the first power converter in a reverse mode to transfer energy from the DC link capacitor circuit to the input of the first power converter.

What is claimed is:

1. A method, comprising:
operating a power converter arrangement in a surge mode, wherein the power converter arrangement comprises: a first power converter comprising an input and an output; a second power converter comprising an input and an output; and a DC link capacitor circuit coupled to the output of the first power converter and the input of the second power converter and providing a DC link voltage, wherein the surge mode occurs when a surge pulse at the input of the first power converter causes the DC link voltage to reach a first voltage threshold,
wherein operating the power converter arrangement in the surge mode comprises:
deactivating the second power converter when the DC link voltage reaches the first voltage threshold; and
operating, at least temporarily, the first power converter in a reverse mode to transfer energy from the DC link capacitor circuit to the input of the first power converter,
wherein operating, at least temporarily, the first power converter in the reverse mode comprises:
deactivating the first power converter when the DC link voltage reaches the first voltage threshold; and operating the first power converter in the reverse mode when the surge pulse has decayed.

2. The method of claim 1, wherein operating the first power converter in the reverse mode when the surge pulse has decayed comprises operating the first power converter in the reverse mode when current driven by the surge pulse through the first power converter essentially reaches zero.

3. The method of claim 2, further comprising monitoring input current of the first power converter to determine when the current driven by the surge pulse through the first power converter essentially reaches zero.

4. The method of claim 2, further comprising monitoring input current of the DC link capacitor circuit to determine when the current driven by the surge pulse through the first power converter essentially reaches zero.

5. The method of claim 1, further comprising monitoring the DC link voltage to determine when the current driven by the surge pulse through the first power converter essentially reaches zero.

6. The method of claim 5, further comprising determining that the current driven by the surge pulse through the first power converter essentially reaches zero when a time derivative of the DC link voltage reaches zero.

7. The method of claim 1, further comprising:
changing from the surge mode to a normal operating mode of the power converter arrangement when the DC link voltage falls below a second voltage threshold,
wherein operating the power converter arrangement in the normal operating mode comprises:
transferring energy, by the first power converter, from the input of the first power converter to the output of the first power converter; and
transferring energy, by the second power converter, from the input of the second power converter to the output of the second power converter.

8. The method of claim 7, wherein transferring energy, by the first power converter, from the input of the first power converter to the output of the first power converter comprise regulating the DC link voltage, and wherein transferring energy, by the second power converter, from the input of the second power converter to the output of the second power converter comprises regulating one of an output voltage or an output current of the second power converter.

9. The method of claim 1, wherein the second voltage threshold is equal to or smaller than the first voltage threshold.

10. The method of claim 1, wherein the power converter arrangement has a DC link voltage reference, and wherein the first voltage threshold is at least 10% higher than the DC link voltage reference.

11. The method of claim 1, wherein the second power converter comprises at least one half-bridge with two electronic switches, wherein the at least one half-bridge is coupled to the input of the second power converter, and wherein deactivating the second power converter comprises switching off the two electronic switches of the at least one half-bridge.

12. The method of claim 1, wherein the first power converter is an AC/DC converter and the second power converter is a DC/DC converter.

13. The method of claim 12, wherein the first power converter is a PFC converter.

14. The method of claim 12, wherein the second power converter is selected from the group consisting of:
an LLC converter;
a phase shift ZVS (zero voltage switching) converter; and
a two-transistor-forward converter.

15. A controller configured to operate a power converter arrangement in a surge mode, wherein the surge mode occurs when a surge pulse at an input of a first power converter of the power converter arrangement causes a DC link voltage of a DC link capacitor circuit of the power converter arrangement to reach a first voltage threshold,
wherein operating the power converter arrangement in the surge mode comprises:
at least temporarily, operating the first power converter in a reverse mode to transfer energy from the DC link capacitor circuit to an input of the power converter arrangement; and
deactivating a second power converter coupled between the DC link capacitor circuit and an output of the power converter arrangement when the DC link voltage reaches the first voltage threshold,
wherein at least temporarily operating the first power converter in the reverse mode comprises:
deactivating the first power converter when the DC link voltage reaches the first voltage threshold; and
operating the first power converter in the reverse mode when the surge pulse has decayed.

16. The controller of claim 15, wherein the controller is configured to operate the first power converter in the reverse mode when current driven by the surge pulse through the first power converter essentially reaches zero.

17. The controller of claim 16, wherein the controller is further configured to monitor input current of the first power converter to determine when the current driven by the surge pulse through the first power converter essentially reaches zero.

18. The controller of claim 15, wherein the controller is further configured to monitor the DC link voltage to determine when the current driven by the surge pulse through the first power converter essentially reaches zero.

19. The controller of claim 18, wherein the controller is configured to determine that the current driven by the surge pulse through the first power converter essentially reaches zero when a time derivative of the DC link voltage reaches zero.

* * * * *